Jan. 29, 1963  J. F. HUTTER ETAL  3,075,641
MATERIALS SORTING APPARATUS
Filed Sept. 1, 1959  11 Sheets-Sheet 1
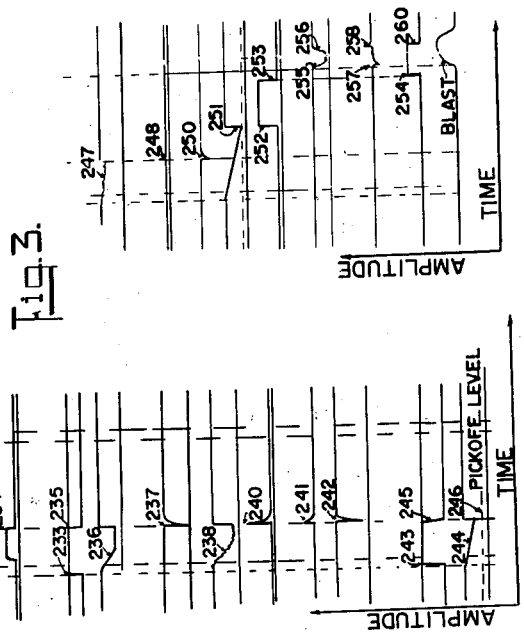
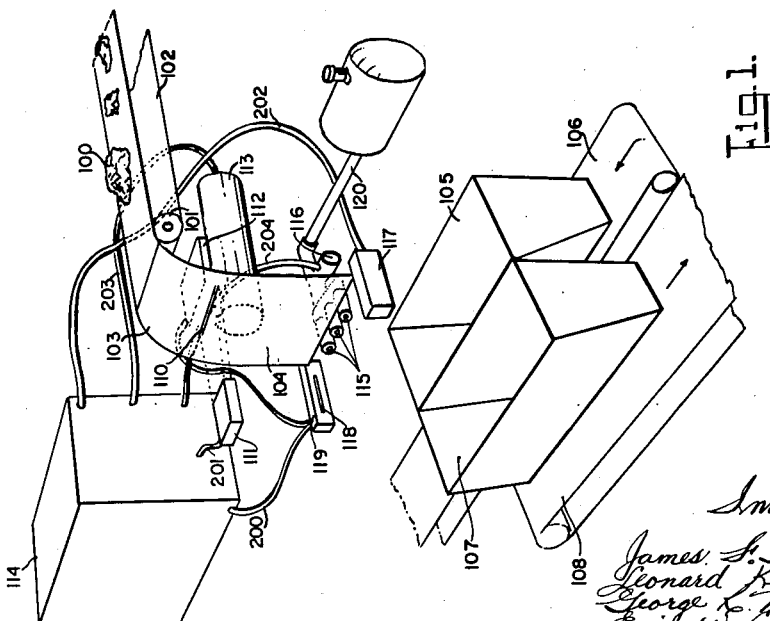
Inventors:
James F. Hutter
Leonard Kelly
George L. Mounce
Eric W. Leaver
By: Alex. E. MacRae
Attorney

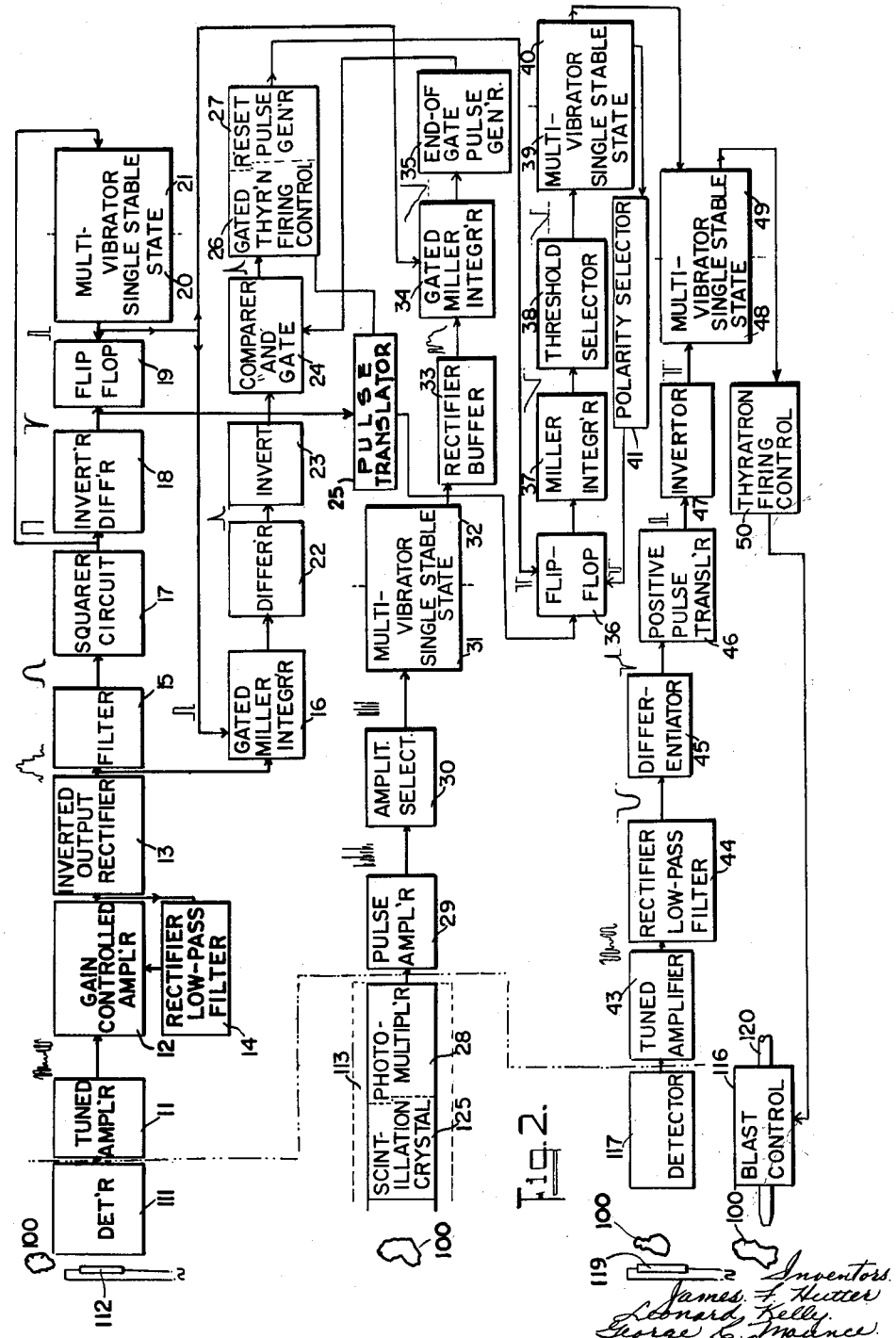

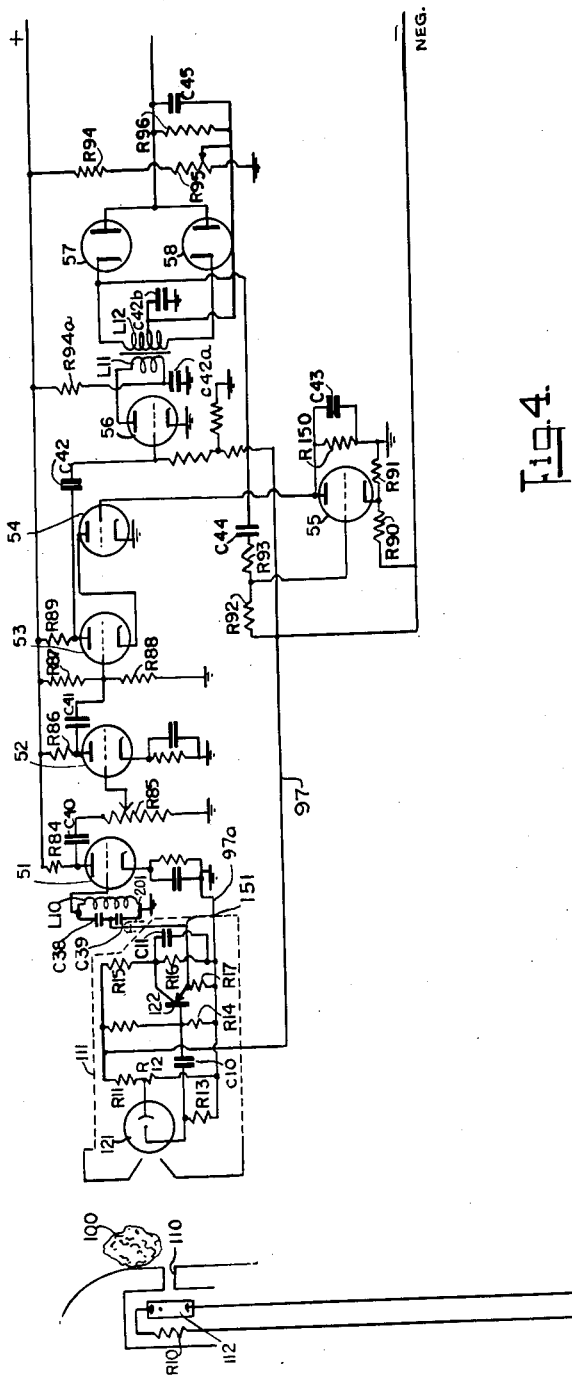

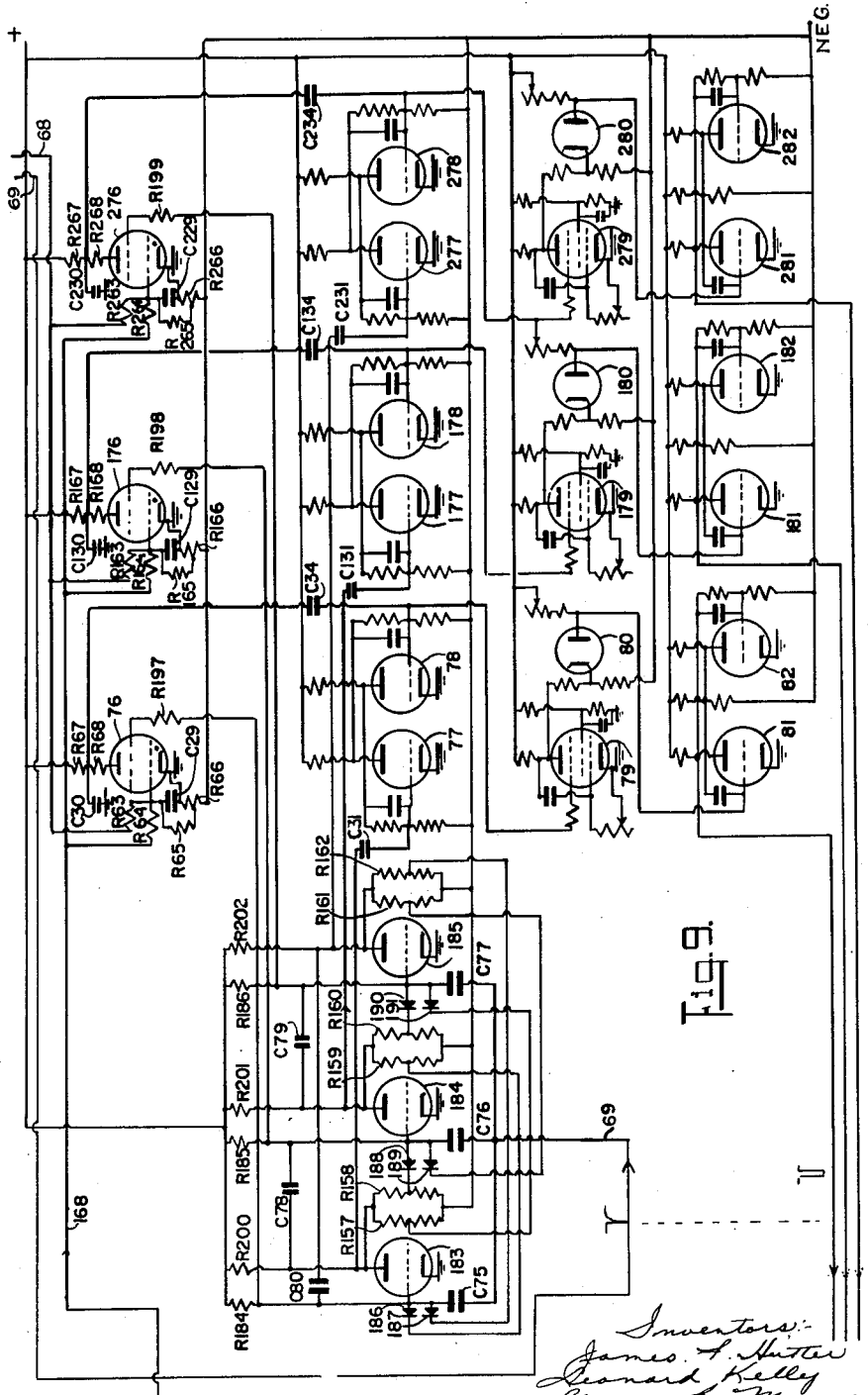

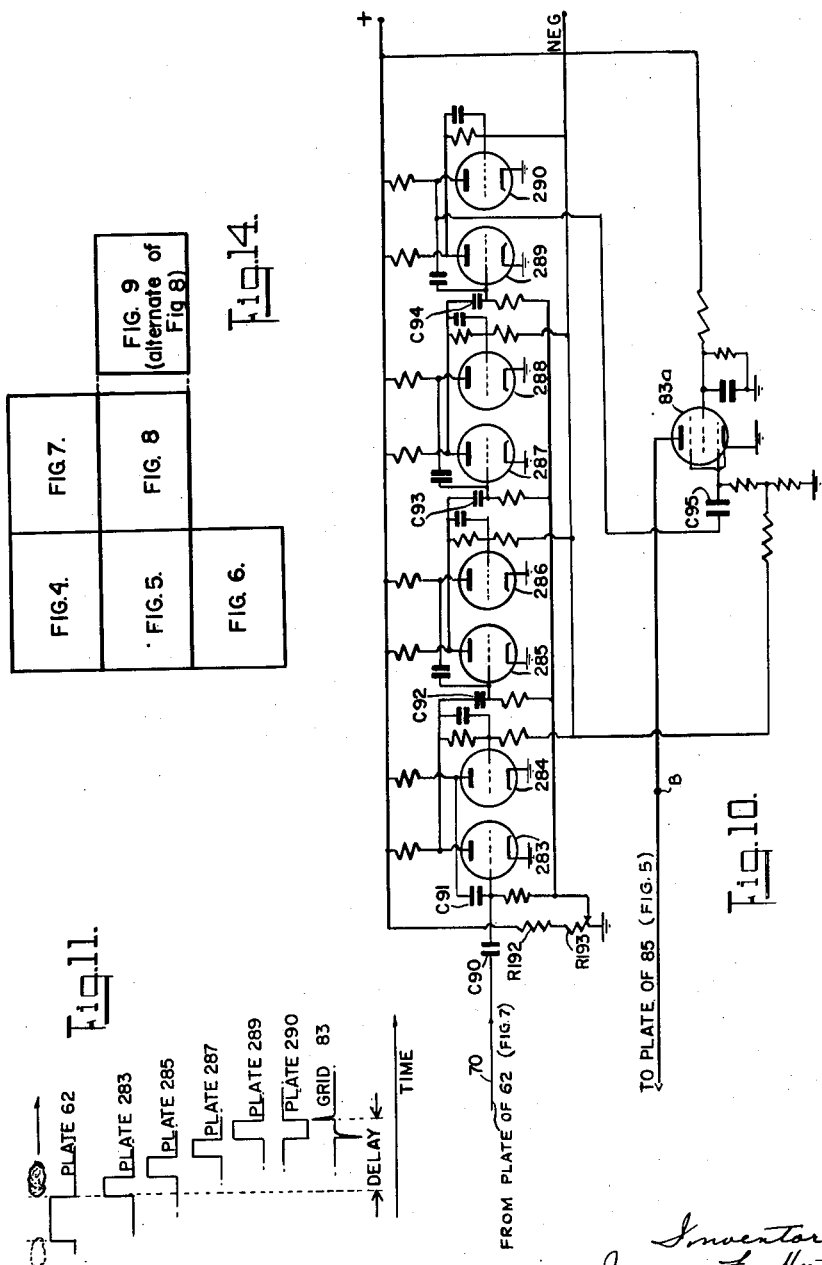

Jan. 29, 1963   J. F. HUTTER ETAL   3,075,641
MATERIALS SORTING APPARATUS
Filed Sept. 1, 1959   11 Sheets-Sheet 10

Inventors:-
James F. Hutter
Leonard Kelly
George L. Mounce
Eric W. Leaver.
By: Alex E. MacRae
Attorney ়
United States Patent Office 3,075,641
Patented Jan. 29, 1963

3,075,641
MATERIALS SORTING APPARATUS
James F. Hutter and Leonard Kelly, Bancroft, Ontario, and George R. Mounce and Eric W. Leaver, Toronto, Ontario, Canada, assignors, by direct and mesne assignments, to K & H Equipment Limited, Toronto, Ontario, Canada
Filed Sept. 1, 1959, Ser. No. 837,402
21 Claims. (Cl. 209—74)

This invention relates to improvements in apparatus for automatic sorting of fragments of material, and in particular concerns apparatus for rejecting lumps of material having less than a predetermined content of a radioactive substance per unit volume or area.

In mining operations, it is often necessary to remove considerable quantities of gangue mixed with ore and the ore itself may be distributed throughout the rock fragments in variable amounts. Uranium mineral values may average about two pounds per ton of removed material but individual pieces of broken rock may be either completely barren or may carry insufficient ore mineral to warrant its extraction. As a first step in concentrating the values, hand sorting has been commonly resorted to in the past, but such operation is time consuming and generally inefficient.

In the copending application Serial Number 718,874, dated March 3, 1958, now Patent No. 3,011,634, and assigned to the assignee of the present application, there has been described method and apparatus for sorting materials which causes a stream of pieces to move sequentially through a sorting zone including a detector for receiving and measuring value-identifiying radiations, and means to initiate an air blast controlled in response to the detection of a predetermined level of radiations from a piece for changing its trajectory in the stream.

Broken rock and ore fragments will ordinarily range in size from extremely small lumps to masses of a maximum handling size of the order of 80 pounds. It is, of course, highly desirable to avoid any need for pre-screening or pre-sorting of such fragments of non-uniform size.

The present invention seeks to provide sorting apparatus which is able to establish for each piece a quantity representing its size, and another quantity representing its content of radioactive substance, so that when compared at suitable attenuations, the relationship of the quantities serves as a gauge for accepting or rejecting the piece.

The determination of fragment size is preferably made without additional handling of the fragment, and according to one practical mode may be carried out by integrating the occulting effect due to a moving fragment as it passes between a stationary light detector and a line source of illumination; according to a second practical mode, the shadow area of a moving fragment is integrated as it occults an extended horizontal stationary detector of radiant energy illumination to which the fragment is opaque. Alternatively, a detector and an associated source of radiant energy to which the detector is sensitive may be arranged in any suitable manner for joint movement relatively to a single fragment, to derive a quantity representing the integral of strip-shadow area with time.

The present invention therefore seeks to improve the reliability and efficiency of radiation detecting and ore fragment deflection devices, and is particularly directed to optical monitoring apparatus effective to derive a first quantity proportional to the cross-sectional area of a fragment in a sorting zone, associated with radiation-monitoring apparatus effective to derive a second quantity as a function of radiation energy or other physical parameter generated by a constituent of the fragment, means to compare the second quantity with the first quantity to establish a further quantity representing a variation of the concentration of the constituent from a standard, and means responsive to the further quantity effective to cause the fragment to be deflected into a reject path, if the concentration of the constituent is less than the standard.

Heretofore, detectors of the type providing a sequence of discrete variable quantities represented by voltages of varying magnitude, have failed to provide an adequately stable reference to which the quantities relate. Since a comparison of cross-sectional area and the amount of penetrative radiation measured for a fragment depends on accuracy of the measured quantities, the present invention provides novel circuits for deriving a succession of unidirectional voltage pulses representing by their amplitudes with respect to a fixed potential, the measured cross sections of fragments, and for deriving a similar succession of unidirectional voltage pulses representing by their amplitudes the fragments' content of radioactive mineral.

The apparatus is so arranged according to the invention that pieces of a minimum size are accurately gauged as to size and worth when spaced from each other in a sorting zone by a minimum distance, regardless of the relative sizes of consecutive pieces, and regardless of the order in which pieces of extremely differing size occur.

In the handling of moving pieces of mixed sizes undergoing sorting, the length of the zone to be traversed will be determined mainly from the maximum physical size of fragments occupying the zone. Consequently, with a fixed spacing of detectors along the zone to accommodate the largest pieces, and with a succession of individual fragments each spaced from its neighbor by at least a minimum distance, moving along through the zone, there may be various numbers of fragments occupying its length. Accordingly, the invention seeks to provide storage means responsive to the arrival of each fragment in the zone, effective to condition reject/accept mechanism operable with a predetermined time delay, to direct each of a number of fragments to a respectively selected destination as it leaves the sorting zone.

It is accordingly a principal object of the invention to determine optically sizes of individual fragments moving through a sorting zone in succession, and to determine the intensity of penetrative radiation emanating from the fragment, for the purpose of estimating the concentration of radioactive mineral in the fragment and thereby to gauge its worth.

It is another object of the invention to provide equipment for deflecting a succession of individual moving fragments or ore-bearing rock and the like toward either of two alternative destinations, in accordance with a comparison of two measured quantities respectively representing the amount of penetrative radiation generated by a radioactive constituent of the fragment, and its cross-sectional area.

It is also an object of the invention to provide storage devices associated with detector apparatus spaced along an extended sorting zone through which fragments move individually, for storing and delaying destination-determining control signals delivered to accept/reject mechanism to synchronize the selection of the destination of each piece with its exit from the sorting zone.

It is yet another object of the invention to provide detector apparatus for establishing a sequence of electrical quantities corresponding to the cross-sectional areas measured for a sequence of fragments moving through a sorting zone, wherein the amplitudes of the quantities with respect to a reference amplitude are substantially proportional to the respective fragment cross-sectional areas.

Still a further object of the invention is the provision of apparatus for estimating a first dimensional parameter of a body determined by at least two physical dimensions thereof, establishing a second non-dimensional parameter for the body proportional to at least two physical dimensions thereof, and for deriving a third parameter proportional to the difference of the first two parameters whereby to control mechanical sorting means operative on the body.

It is yet a further object of the invention to provide means for the determination of concentration of a constituent per unit of volume of a solid fragment of irregular outline, by estimating the volume of the fragment, establishing a measure of the total amount of constituent present, by scanning a field associated with the fragment, detectable remotely therefrom and for comparing the ratio of the said measure to the estimated volume with a predetermined reference ratio.

The invention will be described particularly with reference to the accompanying drawings in which:

FIG. 1 is a perspective view of an ore-sorting station and associated equipment, with control apparatus in accordance with the invention;

FIG. 2 is a block diagram of circuits associated with optical detectors and radioactivity detectors employed in the equipment;

FIG. 3 is a time/waveform diagram showing the signal products associated with the circuits functionally outlined by FIG. 2;

Figure 12:
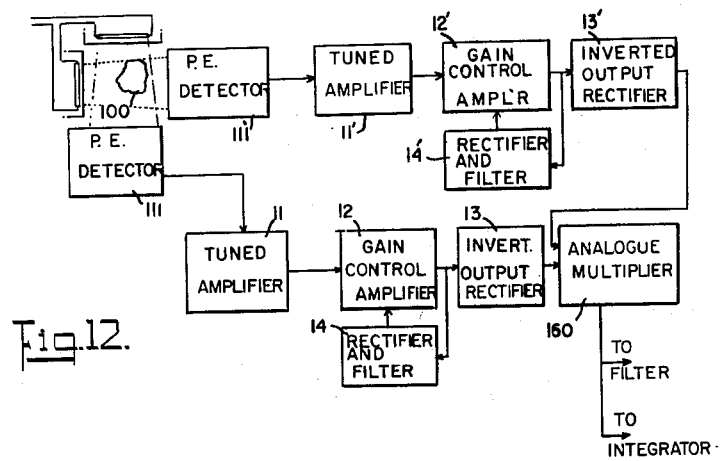
Figure 13:
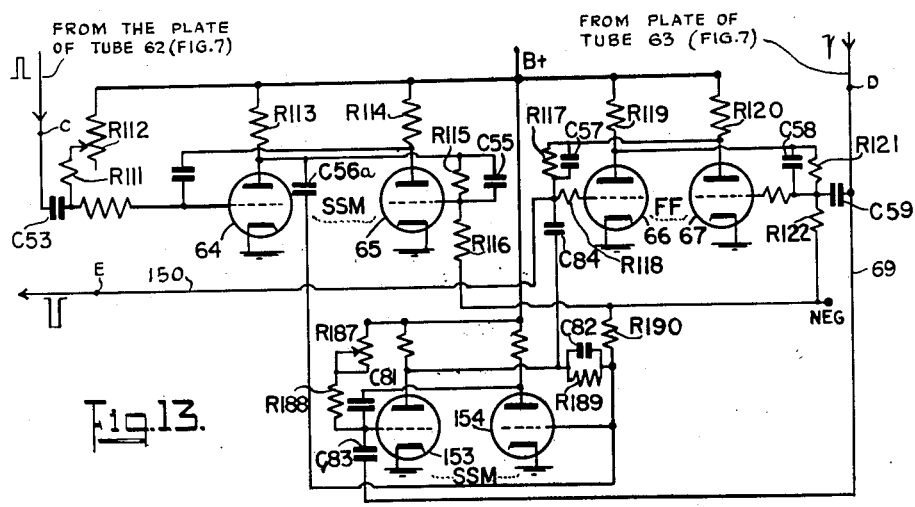
Figure 15:
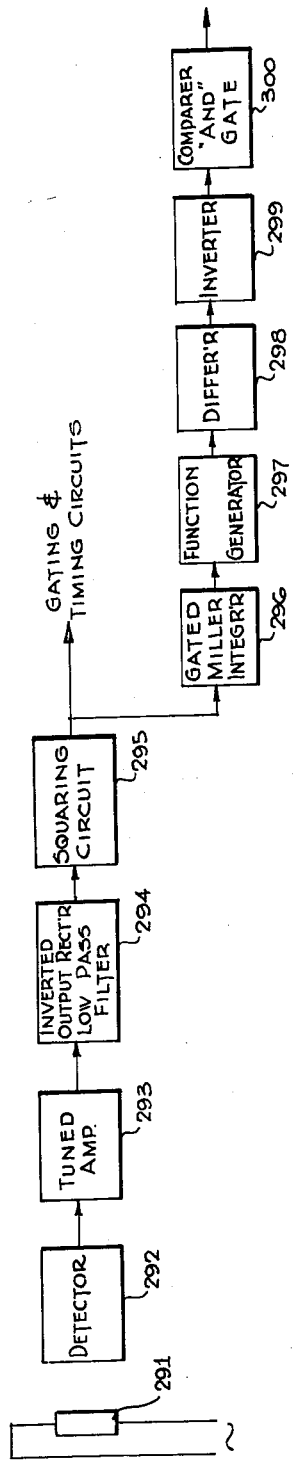

FIGS. 4 to 9 inclusive are directed to portions of schematic circuits outlined by the block diagram of FIG. 2, whose association may be understood by referring to the layout diagram FIG. 14;

FIG. 10 represents an alternative signal storage system for controlling accept/reject mechanism after a predetermined delay, from the arrival of the fragment in a sorting zone;

FIG. 11 is a time/waveform diagram showing the states of the storage system of FIG. 10;

FIG. 12 is a block diagram showing apparatus arranged for optically estimating volume of irregular fragments;

FIG. 13 is a circuit diagram of a comparison timing circuit for overriding normal comparison timing circuits in the event that too large a piece of ore is handled;

FIG. 14 is a layout diagram showing the arrangement of plates of FIGS. 4 to 9 inclusive; and FIG. 15 is a block diagram showing apparatus arranged for optically estimating a single dimension of irregular fragments and thereby deriving a functionally-rotated size signal.

Referring to FIG. 1, control apparatus according to the invention is associated with an ore sorting station, comprising a conveyor system including belt 102 supported in part by roll 101, conveying non-overlapping pieces of rock 100 to a sorting zone. In this embodiment fragments normally are carried at a relatively low velocity to the edge of a downwardly curved shield 103, by which they are guided to fall freely, in the absence of any control, to be caught in hopper 105. The fragments are then conveyed as by belt 106 for further treatment. In sliding over the shield 103, the fragments fall one at a time between the transverse horizontal slit 110 formed in the substantially vertical portion of the shield, and a photoelectric detector 111 spaced in front of the shield. A source of visible or other radiation 112 is disposed behind the shield so that the fragment occults the light received by detector 111 in varying degree depending on its cross-section to derive a quantity representing fragment area. As the fragment continues to fall substantially freely along the face of shield 103, it passes a detector such as a scintillation detector or other penetrative radiation monitoring device 113 disposed behind the shield.

As a result of the measurements made by detector 111 and its associated integrating apparatus, control equipment 114 to which the reading is transmitted determines, as an electrical quantity, the cross-sectional area of the fragment 100, while the quantity of radiation sensed by detector 113 establishes a further quantity indicating the desired constituent. If the ratio of valued constituent to rock fragment mass represented by its cross-sectional area is large enough, control devices 116 are inhibited from causing a deflecting system to impart energy to the fragment to deflect it out of its path. Such deflecting means may be realized as a source of compressed air controllably connected with nozzles 115 to cause the fragment either to fall freely into hopper 105 or to fall under deflection into hopper 107. If the fragment should be too lean in values to merit further processing, a blast of air is initiated from nozzles 115 shortly before or concurrently with the arrival of the fragment in the vicinity of the nozzles, the applied force accelerating the fragment as it falls through the blast to cause it to fall within the hopper 107 for removal to waste. A further light source 119 behind slot 118, and photo-electric detector 117 spaced therefrom across the lower part of the sorting zone, detect the exit of the fragment to control shutting off the air blasts.

The foregoing monitoring, measuring and control apparatus are interconnected with a control unit 114 preferably remotely located with respect to the conveying and sorting system, by suitable cables 200 to 204 inclusive, to be referred to hereinafter in greater detail. A conduit 120 is provided to lead compressed air from any suitable source, as for instance, a compressor or storage vessel.

In its simplest organization the sorting rate for the apparatus would be limited to the rate at which each piece travels through the entire zone, the separation between consecutive pieces being of necessity such that a following piece enters the zone only when the zone is vacant. The maximum possible rate, based on feasibility of controlling deflection devices, would be achieved when a minimum but finite separation is provided between pieces. Accordingly, several pieces would be moving through the sorting zone at any instant, requiring a battery of memory systems serving the measuring and control apparatus to cope with individual fragments. The following description is directed to an improved sorting system for evaluating the concentration of a valued constituent, and discloses a preferred system for correlating deflection control signals with the pieces leaving a sorting zone in which a plurality of spaced pieces may simultaneously be moving.

The sequence of operations of the sorter may be traced by referring to FIG. 2, in conjunction with the time/waveform diagram of FIG. 3. A piece of ore 100 to be sorted on the basis of its percentage content of radioactive mineral enters the sorting zone, reducing the light falling on shadow detector 111. The detected signal amplified by unit 11, comprises an A.C. signal decreased from a steady state, non-occulted maximum amplitude in proportion to the degree of occulting by the fragment. Since the A.C. signal maximum amplitude is affected by a number of conditions in practical installations, due to variable energization of a source, deposits of foreign matter on the detector and/or light source, variable gain of the photoelectric detector and amplifiers, and range of signal fluctuations, a special gain control unit as provided by unit 12 is included. The control includes a rectifier low pass filter 14 which receives the amplifier output and ignores rapid fluctuations while conditioning the gain to produce a constant voltage level referred to a predetermined voltage for a zero shadow state.

Rectifier unit 13 and associated filter 15 produce a signal of unidirectional character, referred to a constant value amplitude or base. The signal then passes through a squarer circuit 17, whose output is fed to an invertor differentiator unit 18, and also to the triggerable side of a single stable state multivibrator composed of sections 21 and 20. The negative output of the invertor differentiator unit 18 is applied to trigger of flip flop 19, which is reset by the delayed pulse produced by the restoration of unit 20.

It will be apparent therefore that the signal passing to trip flip flop 19 initially represents the leading edge of the ore fragment entering the sorting zone, and this signal is passed also to trigger a further flip flop 36 through pulse translator 25. The output of multivibrator side 20 represents a gate lengthening pulse timed to begin coincident with the departure of the fragment from the sorting zone, and terminating a predetermined time thereafter.

The unfiltered output of rectifier unit 13 is passed to a quantizing circuit, consisting of a Miller integrator circuit 16 which produces an electrical quantity representing the area integral of the signal and hence representing the cross-sectional area of fragment 100, to differentiator unit 22 and then to invertor unit 23. The transfer of this quantity is timed by the termination of this lengthened gate pulse from multivibrator 20. This signal corresponds in time to the timing of a further signal derived by a radiation monitoring circuit, in this instance showing detection of penetrative radiation emanating from fragment 100, by a unit 113. This unit comprises scintillation crystal unit 125 associated with a photo-multiplier circuit 28, which feeds a pulse amplifier 29 whose output excludes low level pulses in unit 30. The individual pulses representing individual bursts of radiation are passed to the triggerable side 31 of a rapid self-resetting single stable state multivibrator, which delivers pulse outputs from side 32 to the rectifier buffer unit 33. The number of output pulses corresponds to the number of pulses received per unit time by detector 113, and is functionally related to the radioactive mineral content of the fragment 100. The output of unit 33, in the form of a unidirectional varying voltage, is applied to a Miller integrator 34. The integrating action of integrator 34 is terminated by the trailing edge of the timing pulse from multivibrator 20, at a time just after the passage of fragment 100 past detector 113, so that pulse generator 35 produces and applies to the comparer 24, a unidirectional pulse whose amplitude represents the radioactive mineral content of the fragment. Comparer 24 is arranged as an "and" gate, requiring that input from units 23 and 35 both be present, and that input from unit 35 be the greater to produce an output to pass to the firing control 26. The latter is prepared for firing in the event of output from unit 24, by the application of a pulse from pulse translator 25, timed with the entry of the piece of ore in the sorting zone. Detection of a suitable level of radio activity in the fragment causes the firing of thyratrons 26, which produces a reset pulse from unit 27 associated therewith. Flip flop 36 is triggered through translator 25, by a signal coincident with the entry of a fragment in the sorting zone, which is very shortly reset by a pulse from unit 27. Consequently, Miller integrator 37 does not have enough time to build up an output voltage greater than a threshold, so that no output is passed from threshold selector 38 to trigger multivibrator 39, 40. As the fragment leaves the zone, it passes shadow detector 117, whose output is passed through tuned amplifier 43, rectified and filtered in unit 44, passed to differentiator 45, and only the positive pulse passed further by unit 46. The positive pulse is converted into a negative pulse by unit 47, whose output is applied to the reset side 48 of the single stable state multivibrator 48, 49. Such pulse has no effect on the thyratron firing control 50 which is energized only by triggering of side 49. In the absence of output from unit 40, the blast control 116 is not energized, and the piece of ore 100 is allowed to fall without deflection to be further processed.

In the event that the fragment 100 within the sensitive range of crystal 125 is barren or carries insufficient values to warrant further crushing, the output of unit 35 is a pulse of lesser amplitude than that representing cross-sectional area, so that no output is produced from the "and" gate 24. Consequently, when flip flop 36 is triggered over, a relatively long integration time is permitted for unit 37, so that a pulse is eventually passed by threshold selector 38 to trigger unit 39. In the absence of generation of a reset pulse by firing of thyratron 27, the self-restoration of unit 40 produces a pulse which is passed by selector 41 to reset flip flop 36. While the fragment is falling between the radiation detector station and the end of the sorting zone, the trigger will turn on side 49 of multivibrator 48, 49, simultaneously causing thyratron firing control 50 to go "on" and cause the fragment to be deflected. The delivery of an output pulse from invertor 47 resets multivibrator side 48, simultaneously stopping the deflection by controlling unit 50. The fragment is therefore subjected to deflection within a period determined by multivibrator 39, 40, beginning after the entry of the fragment in the sorting zone, and ending at the time when the trailing edge of the shadow of fragment 100 leaves the zone.

While in the foregoing outline the circuit has been generally described wherein a deflecting force is applied to the fragment and is controlled to stop when its departure from the sorting zone is detected, the force may alternatively be removed by eliminating the detector 117 and subsequent circuits, and employing a delay system timed by a pulse derived from unit 18, representing the exit of the fragment from the area detecting position, and by suitable delay means delivering a delayed pulse in lieu of the pulse produced by unit 47, whereby to turn off the blast. Such organization is described more particularly hereinafter with respect to FIGURES 10 and 11.

*Evaluation of Fragment Cross-Section and Volume*

Ore fragments as received from a crusher and screened to exclude fines below about two inch size have forms varying widely from geometric unidimensional bodies such as cubes and spheres. In the preceding general outline the estimation of fragment volume has been indicated as the result of continuous evaluation of the projected breadth dimension of the fragment as measured in a cross-section produced by a plane intersecting the fragment, which plane is normal to and moves in a direction parallel with a projection plane, to produce the area integral of projected elemental length times projected breadth.

For any irregular solid body a system of three orthogonally related axes may arbitrarily be adopted for establishing directions along which body length, breadth, and thickness respectively are measured. It is only necessary when employing such system of axes that the body be scanned with reference to two axes defining the plane on which the projected area is measured and that the body should not rotate relatively to a line scanning detector device more than a tolerable amount. The scanning may be carried out by any arrangement for sweeping the cross-sectioning plane referred to above in a direction at right angles to such plane. The body may move along an arbitrary length dimension with respect to a stationary detector, or the detector may move differentially or counter to the body movement. It must be understood that the terms "length" and "breadth" in no way are restricted to actual configurations of a body, and that the breadth dimension of a fragment may exceed its length.

In any practical system for realizing the integration of projected body area as outlined, a photoelectric detector, for example, has exposed to it at any instant, a strip of finite length whose area is proportional to the product of the projected breadth dimension and of the projected incremental length of the fragment, which is bounded by two approximately parallel planes spaced apart by a constant distance. The projection plane is perpendicular to the bounding planes and parallel to the length dimension, i.e., to the direction along which the bounding planes move with respect to the fragment. The breadth dimension as detected will generally be intermediate the projected breadths of the fragment taken in the two cross-sections produced by the respective bounding planes. The projected area signal obtained by summation of incremental areas may be used as a first approximation of the volume of the fragment, since it closely approximates the product of projected length and average projected breadth of the fragment. If the output of the area integrator is modified by a multiplier factor which is chosen to represent the third dimension, namely thickness, with a correction for form of an average area fragment, the estimate may be considerably improved. Such estimate may be entirely suitable for determination of concentration requiring volume estimation to an accuracy of, say ±35%, where the range of variation of fragment form and/or thickness is not unduly large with respect to a mean fragment volume. Primary crushing imposes a limit on thickness variations, and moreover the influence of additional thickness increments on the radiation detector is progressively reduced because of increased distance and rock-shielding effects. Modified area quantities have been observed to provide reasonably correct size evaluations for fragments exhibiting wide variations in cross-sectional area.

The customary means employed for handling and conveying unpiled rock fragments, as for example horizontal moving belts or platforms, inherently tend to orient each fragment with its least dimension, i.e. thickness, generally normal to a supporting plane. This self-orientation has been found to be almost completely effective due to the unequal dimensions of fragments of ore and rock. Consequently, if ore is presented in a sorting zone as hereinbefore described, the variation in thickness is not reflected in the projected area quantity obtained, while the area so determined numerically lies well within limits differing by one order. A mean thickness multiplier may be found by empirical procedures. One method found to be useful comprises weighing fragments ranging in size above and below a mean and computing their volumes by dividing by observed densities, and then scanning each fragment and adjusting the multiplier factor until the difference between true and estimated volumes for fragments having a mean thickness and volume is least.

Applications of the process may arise requiring the quantitative estimation of a constituent, the associated physical field of which is detectable only as a surface phenomenon, e.g. beta and ultra-violet radiation. In such cases no modification of the area quantity is required, and a decision is made on the basic assumption that the percentage of the constituents exposed is directly related to its concentration throughout the mass.

Analysis may show that for the fragment-size and value-distribution ranges encountered in a specific application, there exists some function of a single dimension variable (e.g. length) which will provide a sufficiently accurate approximation to the size parameter required (e.g. volume). In such cases a quantity representing the size of a piece may be derived from its length by means of the apparatus shown diagrammatically in FIG. 15.

Referring to FIG. 15, modulated light source 291, photo-electric detector 292, tuned amplifier 293, rectifier filter 294, and squaring circuit 295 produce a pulse of constant amplitude, the duration of which is substantially a measure of the length of the passing fragment. The output of Miller integrator 296 which is directly related to this input pulse duration, is fed to function generator 297 and produces an electrical quantity which is the required function of length as determined for the particular application. The transfer of this information to comparer "and" gate 300 through differentiator 298 and inverter 299, follows the manner and timing previously described.

It is realized that in the case of a fragment falling from a belt, its transit time past a specified point below is, strictly speaking, a non-linear function with respect to its length, i.e. that dimension parallel to the direction of movement. However, calculations and stroboscopic tests have shown that for the purposes under discussion this non-linearity is insignificant, and an adequate approximation to true length may be obtained by measuring the transit time and assuming direct proportionality.

It will be obvious to one skilled in the art that, if required, a closer approximation to true length could be obtained by feeding the transit-time signal to a function generator capable of producing the required function $L=f(t)$ as output. Yet another method involves the photometric measurement of the instantaneous value of light from a light source, elongated in the direction of "length" as defined above, at a time when the falling fragment is interposed between light source and detector.

The estimation of volumes of opaque fragments may be considerably improved in accuracy over the foregoing approximation methods, particularly when the thicknesses and forms vary above and below a mean to such degree that the accuracy of the foregoing method is inadequate. The improvement in accuracy may be realized by scanning projected areas of increments of volume contained between two parallelly spaced bounding planes, the projection of breadth being taken on a plane at right angles to the bounding planes as outlined hereinbefore, and using a multiplier factor derived by simultaneously measuring the projected thickness of the increment of volume. By summation of each computed incremental volume, modified by a factor to convert from rectangular to elliptic cross-section, the quantity derived may closely approximate the true volume regardless of range of any or all dimensions.

According to one practical embodiment, represented diagrammatically in FIG. 12, integration of volume for a body may be carried out by a group of apparatus duplicating the detector system of FIG. 2, arranged to scan the projected thickness dimension of the slice whose projected breadth is simultaneously undergoing evaluation by a breadth-integrating apparatus group. Such apparatus comprises a light source a photoelectric detector 111′, a tuned amplifier 11′, a gain-controlled amplifier 12′, and rectifier stage 13′. The outputs of each of the rectifier stages 13 and 13′ are combined as inputs to a multiplier unit 160, whose product quantity delivered as output is fed at suitable level as input to integrator stage 16. The comparison of the quantity representing volume with the quantity representing energy of detected emanations from the same volume therefore more accurately establishes a basis for accepting or rejecting the body as containing more than or less than the economic minimum of radioactive substance.

The following detailed description of optical and electrical measurement apparatus relates to any one of the estimation methods outlined hereinbefore, and is to be read particularly with respect to the embodiments shown in FIGS. 2 and 4.

In order that the photoelectric detectors should produce a readily amplifiable A.C. signal which is reasonably free from noise due to extraneous light variations, a source of illumination for fragment scanning varying in intensity at a predetermined constant frequency is used for the two light sources 112 and 119. These light sources in one practical system take the form of lengths of slender glass tubing having electrodes sealed into each end and filled to a low pressure with a mixture of ionizable gases, chiefly neon.

Figure 6:
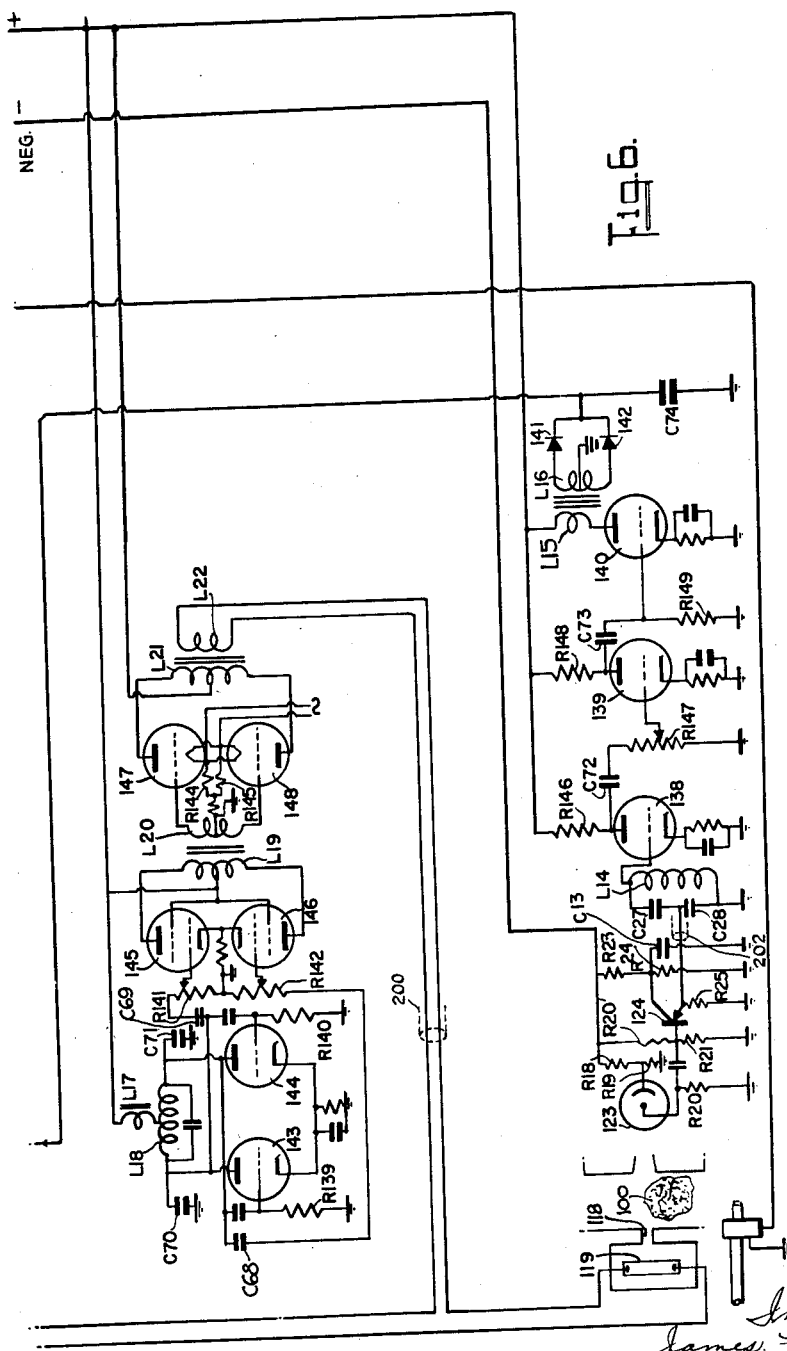

Referring to FIG. 6, triodes 143 and 144 comprise a push-pull oscillator, whose frequency of oscillation may have any suitable value, provided it is higher than the normally encountered rates of change of ambient light, for example from several hundred to several thousand cycles per second. The output from the oscillator is capacity coupled through condensers C68 and C69 through dual gain controls R141 and R142 to the grids of driver tubes 145 and 146. The output from these tubes is coupled through transformer windings L19 and L20 to the grids of power amplifier tubes 147 and 148. These tubes in turn drive the light sources through matching transformer windings L21 and L22.

The light source tubes 112 and 119 are connected in series as load on the supply by means of cable 200. A ballast resistor R10 (FIG. 4) is connected in series with both tubes in the circuit fed by secondary L22 of the output transformer of the source. This resistor limits the peak current passed through the light tubes. Alternatively, a suitable low watt loss type of current ballast device as well known in the art may be used. The frequency at which the intensity of light output varies is twice the oscillation frequency since gaseous conduction through the gases filling the tubes occurs on both the positive and negative swings of the output voltage applied from the light source driver circuit.

The illuminated guard slot 110, FIG. 1, which exposes the line source of illumination is for all practical purposes the effective light source. A portion of the light collimated thereby falls on photocell 121 spaced from the slot and located in the area photoelectric detector head 111. A current which fluctuates at a rate equal to that at which the light intensity varies is thereby produced through photocell 121. This current flowing through load resistor R13 produces a voltage signal which is coupled to the base of transistor 122 through coupling condenser C10. Transistor 122 is an emitter follower. Its purpose is to produce an output of essentially the same amplitude as the signal developed across resistor R13 but at a much lower impedance in order that the signal may be transferred to the main control unit without loss in signal amplitude. The proper voltage for operating the photocell 121 is obtained from voltage divider R11, R12 and the proper operating voltage for transistor 122 is obtained from voltage divider R15, R16. Both voltage dividers are supplied from a negative source of voltage by conductor 97, supplied from the control unit.

The area photoelectric detector head 111 is connected with the main control unit by cable 201, FIGURE 1. This cable may be any convenient length and, as indicated in FIGURE 4, includes the conductor 97 leading from the negative supply voltage source, a grounded conductor 97a, and a conductor 151 which conveys the output signal from the emitter end of R17 in the photoelectric detector head and is connected to the junction of condensers C38 and C39. These two condensers in conjunction with inductance L10 comprise an impedance matching circuit resonant at the frequency of the signal from the photoelectric detector head. The alternating voltage developed across inductance L10 is considerably greater than the input signal voltage due to the characteristics of the resonating circuit, which also acts as a band-pass filter tending to reject extraneous signals having a frequency different from that of the signal produced through the photocell head due to the light source.

The voltage developed across inductance L10 is applied to the grid of triode 51 which functions as a voltage amplifier. The output from its plate is applied to the grid of triode 52 through C40 and variable attenuator R85. Tube 52 is connected as a voltage amplifier. The A.C. voltage output from its plate is capacitively coupled by condenser C41 to grid of triode 53. This triode is an amplifier with a gain arranged to be dependent upon the bias conditions on the grid of triode 54 connected in series with the cathode of tube 53. The signal from the plate of tube 53 is capacitively coupled by C42 to the grid of triode 56. This triode in turn drives a full wave rectifier comprising 57 and 58 through matching transformer L11, L12. The winding L11 of the matching transformer has one end connected to the plate of tube 56 and the other end connected through resistor R94a to the positive supply. A plate by-pass capacitor C42a is connected between the other end of winding L11 and ground. The centertap of winding L12 is by-passed to ground for high frequencies by capacitor C42b. An output is taken from one terminal of the secondary winding L12 and is fed through condenser C44 to attenuator R92, R93. The attenuated signal at the junction of these resistors is fed to the grid of triode 55 whose plate circuit is composed of resistor R150 shunted by condenser C43. The time constant of the combination of C43 and R150 is arranged to be long compared to the period of fluctuation of detector signals due to ore pieces passing between the area light source and the area photoelectric detector head. The value of resistance R150 is moreover arranged to be high compared to the plate resistance of tube 55. It will be noted that the cathode of tube 55 is returned to a source of intermediate negative voltage. Plate current flowing through resistor R90 therefore produces a cathode voltage which is negative with respect to ground. When space current flows from cathode to anode the latter becomes negative with respect to ground, and hence biases negatively the grid of triode 54 which is directly connected with it. The anode of triode 54 is connected in series with the cathode of triode 53. The gain of triode 53 is thereby controlled by the negative voltage produced across resistor R150 which in turn depends upon the amplitude of the signal on the secondary of transformer L12. The action of this circuit is to maintain the peak output voltage from transformer secondary L12 essentially constant. When the light falling on the photoelectric detector head is constant, the output voltage from secondary L12 is also constant. The automatic gain control circuit comprising triode 54 and triode 55 adjusts the amplitude of the secondary L12 voltage output to a preset value by controlling the gain of triode 53. If now a piece of ore falls through the sorting area momentarily reducing the light reaching the photoelectric detector head and consequently reducing the output from the secondary L12, the automatic gain control circuit ignores this change since the time constant comprising resistor R150 and condenser C43 is very long compared to the duration of the reduction in output. When a succession of ore fragments continuously streams through the scanning zone the average output voltage from secondary L12 would, in the absence of gain stabilization, be considerably reduced. A normal automatic gain control circuit would operate to keep the average output voltage constant, with the result that the peak signal amplitudes, representing output when the detector is entirely free of shadow, would be considerably higher than the value which should exist when no ore is passing through the sorting zone. Due to the much lower value of the operating plate resistance of triode 55 as compared with the value of resistor R150, the automatic gain control circuit adjusts only when the peak output signals are present at the transformer secondary, and therefore stabilizes the A.C. level of the amplifier output whenever no ore is passing between the area light source and the area detector head.

The current delivered from the full-wave rectifier comprising diodes 57 and 58 fed by the output of secondary L12 produces a voltage drop across load resistor R96 which is connected between the common plates of diodes 57 and 58 and the centertap of winding L12. The current direction in the resistor is such that the upper end is negative. The potentiometer R95 is fed a positive voltage from the plate supply through dropping resistor R94, whereby to produce an adjustable voltage from the center arm of potentiometer R95. The bottom end of load resistor R96 is connected to the tapping point of the potentiometer. It will be observed that the potentiometer voltage and the rectifier output voltage are therefore in series, and since these voltages are opposed it is possible by proper adjustment of potentiometer R95 under steady state conditions to set up a zero voltage condition between the top of load resistor R96 and ground. The passage of a piece of ore between the area-scanning light source and the area detector head causes reduction of the voltage output of the rectifier, as described. If this voltage has been adjusted to be zero when no ore is in the sorting zone, a positive-going signal is produced between the top end of load resistor R96 and ground each time a piece of ore passes through the scanning zone.

Condenser C45 across the output of the rectifier together with inductance L13 and condenser C49 (FIG. 7) comprise a low-pass filter. The output of this filter is applied through limiting resistor R102 to the grid of triode 61. The purpose of the filter is to remove from the grid of triode 61 the ripple frequency present on the output of the rectifier. The cut-off frequency of the filter is high enough, however, to allow the changes in the output from the rectifier due to the passage of ore pieces to be applied to the grid of triode 61 without appreciable attenuation.

The output from the plate of triode 61 is connected to the grid of triode 62 through voltage divider comprising R105 and R106. A condenser C50 is placed in parallel with R105 to improve the speed of response of the circuit. This divider has its bottom end connected to the negative supply voltage. The divider is so designed that when the voltage of the grid of triode 61 is zero with respect to ground, the output voltage from the plate of triode 61 biases the grid of triode 62 so that the latter is fully conducting. The cathode current in triode 62 flows through common cathode resistor R151 thereby producing a positive voltage on the cathode of triode 61. It will be apparent therefore that positive voltage is applied to the cathode of triode 61 to maintain the plate current of that tube cut off when no ore is moving between the light source and the area scanning detector head.

When a piece of ore interrupts a portion of the light falling on the area detector head, the voltage on the grid of triode 61 swings positive as previously described. This positive-going signal causes triode 61 to conduct, reducing the potential at the plate, which reduction, acting through voltage divider R105, R106 cuts off the plate current in triode 62. Since the cathode current of triode 62 is cut off, the voltage due to this source of current is no longer developed across resistor R151. The common cathode resistor assists in effecting transfer of current between triodes.

The action of triodes 61 and 62 is therefore to produce a positive-going, essentially rectangular voltage pulse at the plate of triode 62 having a duration corresponding to the passage time for a piece of ore to move past the strip light source 110. The output from the plate of triode 62 is capacitively coupled by condenser C51 to the grid of pentode 63. The combination of condenser C51 with grid resistor R108 has a time constant short compared to the passage time referred to. Resistor R107 has a relatively high value which does not appreciably affect this time constant and being connected to the negative supply, it causes a negative voltage to be produced on the grid of pentode 63 sufficient to cut off the plate current during the "no signal" condition. At the beginning of the rectangular voltage pulse produced at the output of triode 62, a differentiated positive-going signal is applied to the grid of pentode 63. This short duration positive-going pulse is of sufficient amplitude to cause a momentary pulse of current to flow through pentode 63, thus producing a relatively short negative-going signal at its plate through load resistor R109. The differentiated signal at the end of the rectangular voltage pulse from the plate of triode 62 produces a negative-going signal at the grid of pentode 63, but since the device is ordinarily in the cut-off condition no output signal is produced when the ore leaves the scanning zone.

The negative-going "entry" pulse appearing at the plate of pentode 63 is applied through a small capacitance C59 to the grid of triode 67. The pair of triodes 66 and 67 together with the resistors and condensers associated with these tubes form a flip-flop circuit, hereinafter denoted by the abbreviation FF. Conditions as established by the previous history of the circuit are such that triode 67 is conducting and triode 66 is cut off. The trigger pulse from pentode 63 flips the stage so that triode 66 conducts and triode 67 is cut off. This condition is maintained until the stage is reset by a negative pulse acting through small capacitance C56 from the plate of triode 65.

Triode 64 and triode 65 together with the resistors and condensers associated with these two tubes form a single stable state multivibrator, hereinafter designated by the abbreviation SSM. The time constant of the multivibrator is principally determined by capacitance C54, resistor R111, and variable resistor R112. The normal condition of the stage is that triode 64 is conducting and triode 65 is cut off. Small capacitance C53 couples the grid of triode 64 to the plate of triode 62. It will be recalled that a positive-going rectangular voltage pulse is produced at the plate of triode 62 during the passage of a piece of ore through the sorting zone. Due to the differentiating action of capacitance C53, a short positive-going pulse is produced at the grid of triode 64 at the beginning of the output signal from triode 62. Since triode 64 is already fully conducting, this pulse has no effect on the SSM circuit. At the end of the rectangular voltage pulse from triode 62, the differentiating action of capacitance C53 produces a short negative-going pulse at the grid of triode 64. This signal triggers the SSM so that triode 65 becomes fully conducting and triode 64 is cut off. This condition exists until the stage resets after a period determined by the values of condenser C54, resistor R111 and variable resistor R112.

The output from the plate of triode 64 takes the form of a positive-going rectangular voltage pulse. This signal is applied through small capacitance C56 to the grid of triode 66 in the FF circuit. As previously described, when the signal from triode 64 goes positive, the FF circuit conditions are such that triode 66 is in conducting state. The positive-going signal has therefore no effect on the FF. When the SSM circuit resets, the voltage pulse fed to the grid of triode 66 through small capacitance C56 is negative-going and hence resets the FF stage to its original condition.

Considering the over-all action of the FF and the SSM stages, it will be apparent that the FF is triggered over when a piece of ore begins to interrupt light falling on the area detector head. The FF stage remains flipped over until the piece of ore no longer casts a shadow on the area detector head and remains in this state for an additional period equal to the duration of the unstable state of the SSM. Referring to FIG. 1, it will be noted that a fragment of ore passes first between the area light source and the photoelectric detector head, and then passes in front of the scintillation crystal. The output from the FF, occurring a predetermined time after exit of the fragment from the scanning zone, is subsequently used as a gating signal for making a comparison between two quantities, as will be more particularly described hereinafter. If the FF were reset immediately the fragment ceased to shadow the area detector, the gating circuit controlled thereby would be turned off prematurely particularly for larger sizes of fragments. Since the radiation detector apparatus, to be elaborated hereinafter, is spaced a distance along the direction of fragment movement from the area detector head, the comparison requires to be made at a time when the radiation field has been scanned. It is the purpose of the SSM circuit to lengthen the gate pulse, which as carried to other parts of the circuit by lead designated 150.

The grid of pentode 59 is connected through variable resistor R97 to the anodes of the full-wave rectifier comprised of diodes 57 and 58. As previously stated, the voltage difference of the diode anodes with respect to ground is zero when no ore is interposed between the light source and the area detector head. During this period the FF stage has triode 67 conducting and triode 66 cut off, as explained, the voltage at the grid of triode 66 being negative with respect to the grounded cathode. The suppressor grid of pentode 59 is connected with the grid of triode 66 by way of lead 150 and resistor R152. No plate current flows in pentode 59 under these conditions. When a piece of ore interrupts a portion of the light from the light source falling on the area detector the voltage at the output of the rectifier goes positive and almost simultaneously the FF stage is triggered over so that triode 66 is conducting. The voltage at the grid of triode 66 is held very near zero by reason of grid current phenomena. As a result, the voltage fed to the suppressor grid of tube 59 is reduced nearly to zero allowing plate current to flow. The stage comprising pentode 59 as connected with its associated components comprises a Miller integrator. The rate at which the plate current through pentode 59 can increase for a given voltage applied to its grid through grid resistor R97 is determined primarily by the value of capacitor C46. Over the operating range of pentode 59 the rate of change of space current is practically independent of the actual voltage on the pentode plate. When the variable voltage from the output of rectifier diodes 57 and 58 is applied for a given period through the grid resistor to the grid of pentode 59 the voltage drop across the plate load resistor R98 is substantially equal to a constant multiplied by the integral of the instantaneous voltage output from the rectifier. When the FF resets and produces a negative voltage on the suppressor grid of the pentode, the plate current drawn by pentode 59 immediately ceases and the plate voltage rises to the value of the plate supply. The magnitude of the change of voltage resulting at the plate of pentode 59 is therefore proportional to the integrated value of the voltage output of the anodes of diodes 57 and 58, during the evaluation period. It should be recalled that there is a positive voltage output from the rectifiers only during the time that an ore fragment interrupts a portion of the light from the area light source. Once the ore has fallen below the scanning zone the output from the rectifiers returns to zero, and although the gating voltage on the suppressor grid still allows plate current to flow, its value does not change since positive voltage is no longer applied to R97.

The plate of pentode 59 is coupled through condenser C47 and voltage divider R153, R153' to the grid of triode 60. For the period during which the gate pulse endures and the plate voltage of pentode 59 is decreasing, a negative signal is fed through condenser C47. This signal will be small since capacitor C47 and the divider resistance R153, R153' have a time constant short compared to the gate period. The grid of triode 60 is prevented from going negative by the grounded diode 91 connected to conduct in the direction from ground to grid. Bias conditions for triode 60 are established by means of current flowing from the plate supply through resistor R101 in series with cathode resistor R100. The cathode is thereby so biased that the triode space current is very nearly cut off. At the end of the gate period, when the voltage at the plate of pentode 59 abruptly increases in the positive direction, an attenuated positive signal is delivered to the grid of triode 60 and causes a corresponding negative-going pulse to appear across load R99 at the triode plate. The constants of the over-all circuit are so chosen that a gain of approximately unity obtains for signal transfer from the pentode plate to the triode plate. It will be self-evident that the triode stage 60 acts merely as a pulse inverter. The negative-going voltage pulse at the plate of triode 60 is substantially of the same amplitude as the voltage which existed across load resistor R98 in the plate circuit of pentode 59 at the termination of the gate period. This negative pulse is passed by capacitor C48 over lead 68 to other portions of the apparatus as will be further described.

Radiation Monitoring System for Fragments

Radioactive substances contained in a body are known to emanate penetrative and particle radiations sporadically at rates proportional to mass of radioactive substance, and suitable detection devices may be used to detect such radiation at a distance from the body. The approximate determination of content of radioactive substances in ore fragments as related herein is made possible by the provisions of detector apparatus according to the invention for remotely measuring a portion of the radiation field accompanying each fragment. The following general discussion is presented to assist in understanding the objects and purposes of the arrangements contemplated for the aforesaid apparatus.

In any practical system fragments of a carrier solid such as rock minerals may range widely in size and shape. The accurate determination of amount of radioactive matter with the speed required to enable large volumes to be monitored and sorted at low cost has hitherto not been feasible, particularly when the economic minimum content is set at a low value, as when sorting lean ores.

The movement of ore as longitudinally spaced fragments passing consecutively through a sorting zone at a substantial number of tons per hour rate requires to be relatively rapid when fragments average twelve pounds or less in weight. In the sorting scheme particularly described herein, the fragments are positioned singly in line and are spaced along a conveyor belt by any suitable means, for example by such means as are more particularly described in conjunction with the aforesaid copending application Serial 718,874. The latter disclosure describes mechanism whereby single solid bodies are deposited on a moving conveyor so that each is spaced by at least a predetermined distance from its neighbour, this distance being a fraction of the length dimension of a minimum piece of ore.

Horizontally moving conveyors of the type having an end roll from which fragments are discharged with a horizontal velocity less than two feet per second have been found to time-space irregular bodies falling from the end roll in approximately direct ratio to the distance between verticals passed through centers of mass of adjacent fragments. By reason of such spacing, a body enters the sorting zone following a preceding body with a time delay approximately equal to the time taken for the conveyor to move a distance equal to the spacing of their centers of mass. The foregoing relationship has been found to be very nearly correct for bodies having thicknesses which are a small fraction of their lengths. Since it is probable that two or more minimum sized fragments may follow each other in sequence, the resolution between individual fragments by radiation detection devices is required to be sufficiently sharp to discriminate between such pieces even though they follow each other through the zone at relatively short time intervals. For example, in one practical sorting apparatus according to the invention, consecutive ore pieces of minimum size were observed to have arrival times spaced about 120 milliseconds apart. At a horizontal reference plane spaced one foot vertically below the axle of the conveyor end roll, these fragments were observed to have a free fall velocity fractionally greater than eight feet per second. When the lowermost portion of a succeeding fragment had just reached this plane, the uppermost portion of a preceding fragment of minimum size was noted to be spaced not less than ten inches vertically below the plane. The vertical length of the path along which the detector is permitted to respond to emanating radiation of a fragment may not exceed this spacing, and preferably should be less, e.g., about eight inches, so as to afford "guard" periods between consecutive fragments during which radiation detected is zero. Applicants have discovered that it is possible to provide a radiation detector system of improved sensitivity which achieves excellent resolution between consecutive pieces, and which effectively receives emanations from each piece singly throughout a time interval which is a large fraction of the interval between successive arrivals of pieces in the zone. A sensitive detector, for example a battery of ionization chambers or preferably a large scintillating crystal coupled to a photomultiplier tube and sensitized to gamma ray energy emitted from uranium minerals, is employed for this purpose. The detector requires to be shielded on all sides except for a vertical aperture facing the trajectory of falling fragments to render it insensitive to background and extraneous radiation and sensitive only to rays diverging but slightly from a preferred direction, for example the horizontal. The vertical extent of the aperture is preferably made fractionally less than the least distance between a pair of consecutive falling fragments and the aperture itself is so located along one side of the sorting zone that the trailing end of a preceding fragment has just passed beyond the level of the aperture's lower margin while the leading edge of the next following fragment has just reached the level of the upper margin.

The horizontal extent of the aperture may be made equal to the largest breadth of any fragment.

Those skilled in the art will be aware that the detector aperture may be made relatively opaque to all rays deviating more than a predetermined angular distance with respect to a preferred direction of sensitivity, by use of suitable shields; for example, screens or grids may be employed by which the area of the aperture is subdivided into a large number of apertures of lesser area, each bounded by thin walls extending parallel with the preferred direction, comprising a relatively dense shielding material.

Since the disintegrating nuclei of radioactive elements radiate gamma rays substantially uniformly in all directions, the amount of energy passing through any spherical sector subtending a predetermined solid angle with the source of the rays as its apex, will be, for any period long with respect to extremely short time intervals, proportional to the total spherically radiated energy. The content of radioactive substance carried by a fragment of ore may directly be related to the energy measured per unit of time passing through an area subtending such solid angle. By disposing a detector which is sensitive to gamma rays to intercept a predetermined portion of the ray energy for a predetermined period, for example by intercepting rays which pass through the aperture and emanate from the fragment mainly along the direction of the thickness dimension, a quantity may be obtained as the integral of instantaneous energy and the time period. When suitable constants of integration are chosen, this quantity may be taken to represent as a fair approximation the content of the radioactive substance.

The detection zone may be regarded as having approximately the configuration of a frustum of a cone or of a pyramid, generally having a horizontal axis, bounded at one end by the aperture and at the other end by a section of a vertical plane spaced an arbitrary distance from the aperture so that fragments pass entirely therebetween, the zone having lateral and vertical extent limited as set out previously to resolve spaced consecutive fragments and to permit complete scanning of any fragment falling through the zone. In general, it will be preferred to have fragments pass with one side just grazing the aperture or moving with minimum clearance with respect to the aperture plane, to enhance detection sensitivity. Alternatively, a plurality of detector devices may be disposed to scan the fragments simultaneously from two or more directions as they fall more or less equidistantly from such detectors through a common detection zone. Such arrangement will in general be unnecessary except where the thickness of host rock and the nature of dissemination would give inaccurate determinations if the fragments were scanned from one direction only. In employing a plurality of detectors, a signal which is the sum of the integral quantities of field intensity and time for each detector would be provided, suitably modified for comparison purposes.

In determining the location of and vertical extent of the detection zone with respect to the point of discharge of fragments into the sorting zone, a number of factors must be considered. Since a finite minimum period is established between the arrival times of fragments entering the zone regardless of distance of fall with respect to the discharge point, the zone location is primarily determined by considerations of desirable aperture cross-section and detector resolution between adjacent minimum fragments. In addition, the length of fragments will locate the upper limit of the detector zone at a distance somewhat below the leading edge of the longest fragment when the latter is turned nearly upright prior to falling free from the end roll of a conveyor. Since the rate of change of velocity of a freely falling body starting from rest with respect to distance the body has fallen is greatest in the vicinity of the rest point and thereafter decreases, it is advisable to set the upper limit of the zone still lower, so as to delay scanning until the fragment has reached a velocity of at least five feet per second. The detector zone may be placed still lower, e.g., at a point where the velocity of fall is sixteen feet per second; however, the detection of radiation energy of fragments moving at such velocity would require a detector with a greatly extended vertical aperture and sensitive volume to achieve detection sensitivity comparable to that obtained at lower velocities, and hence would incur a greatly increased cost of detection devices.

While the fragment is falling through a distance it gains in velocity according to the relation:

$$\Delta V = \sqrt{2gh_2} - \sqrt{2gh_1} \quad (1)$$

where:

$V$ is the instantaneous velocity,
$g$ is the acceleration due to gravity, and
$h_2$ and $h_1$ are distances of free fall with respect to a rest point at which $V=0$.

When the detection zone has a theoretical vertical extent S, so that:

$$H_2 = h_1 + S$$

$\Delta V$ may be written:

$$\Delta V = \sqrt{2g}(\sqrt{h_1 + S} - \sqrt{h_1})$$

and introducing units into the above equation with distances in feet, velocity in feet per second, and setting $g = 32$ ft. per sec. per sec., then $$\Delta V = 8(\sqrt{h_1 + S} - \sqrt{h_1}) \text{ ft./sec.} \quad (2)$$

For a given separation time between centres of fragment mass falling in the detection zone, due to conveyor characteristics, and designating this time $\Delta T$, where $$\Delta T = \frac{\Delta V}{g}$$

$$\Delta T = \frac{1}{4}(\sqrt{h_1 + S} - \sqrt{h_1}) \text{ sec.} \quad (3)$$

From the foregoing, in any system where $\Delta T$ and S are controlled by considerations of conveyor speed and detector size, the value of $h_1$ may be directly found from Equation 3. It should be noted that the aperture vertical extent, $S'$, will require to be less than S to provide guard zones and because of the length of a minimum sized piece of ore.

In the following detailed description, to be read with respect to FIG. 5, a radiation detector apparatus having a single radiation sensitive device is described. It is to be understood that where a plurality of detectors may be used, these will be substantially similar.

Radiation Detector Circuit

The scintillation detector head 113 of FIG. 1 is shown in the circuit diagram as comprising a scintillation crystal 125 optically coupled to a photomultiplier tube 126. A lead 130 is connected with a negative high voltage source in the main control unit 114 for operating the photomultiplier. This voltage is applied through resistances R28, R29 to regulator tube 127 of the corona type, which functions, together with capacitors designated C15 as a regulator for maintaining the supply to the photomultiplier relatively constant. The output from the photomultiplier is obtained across load resistor R27, in the form of short negative-going signal pulses. One pulse is produced each time a scintillation occurs within the volume of the scintillation crystal. The rate at which scintillations occur is dependent on the coupling of sufficient radiation wave energy with light-emitting electrons in the crystal to excite such electrons.

The signal pulses produced at the output of the photomultiplier tube are applied through condenser C14 to the grid of pentode amplifier 128.

The pulse output taken from the plate of pentode 128 is inverted and amplified with respect to the input, and is coupled by capacitor C16 to the grid of cathode follower triode 129. The signal output developed across low impedance cathode resistor R33 is conducted by a lead in the detector head cable 203 to the main control unit. It will be understood that conductors in the cable provide suitable supply and operating voltages necessary for the stages in the preamplifier.

The radiation energy signal output from the cathode followers stage 129 is applied to the grid of pentode amplifier 132. The latter, together with pentode amplifier 133, forms a two-stage resistance-capacity coupled pulse amplifier with stabilizing feedback provided from the plate output of pentode 133 to the cathode end of degenerative resistor R36 of pentode 132 through condenser C20 and resistor R51. Anode loads respectively are R37 and R39, the former being coupled through C19 to the grid end of resistor R38.

The output from pentode 133 is also applied through condenser C20 to variable attenuator R40 whose output is fed through resistor R41 in parallel with capacitor C21 to the grid of pentode 134. Resistor R42 is connected between the pentode grid and the negative biasing supply, to bias the grid beyond plate current cut-off. The signals applied to the grid of pentode 134 from the output of amplifier tube 133 are in the form of positive-going signal pulses of short duration, with inherent photomultiplier noise pulses. A signal pulse of sufficient amplitude will cause a momentary pulse of current to be drawn by pentode 134 through load resistor R43. This load resistor also serves as the plate resistor of triode 136. Triode 136 and pentode 135 form an SSM. The design of this SSM is conventional and has an "on" time determined by the value of capacitance C22 and resistor R45 connected in series with variable resistor R46 between positive supply and the control grid of pentode 135. The "at rest" condition is with pentode 135 fully conducting, for which condition the voltage at its plate is low. When a trigger pulse is produced through pentode 134, the voltage at the plate of pentode 135 goes positive producing a rectangular voltage pulse of duration corresponding to the "on" time of the SSM. The grid of triode 136, coupled by capacitor C23, goes positive, but thereafter is biased to cut off by resistors R47 and R48 from negative supply.

Figure 8:
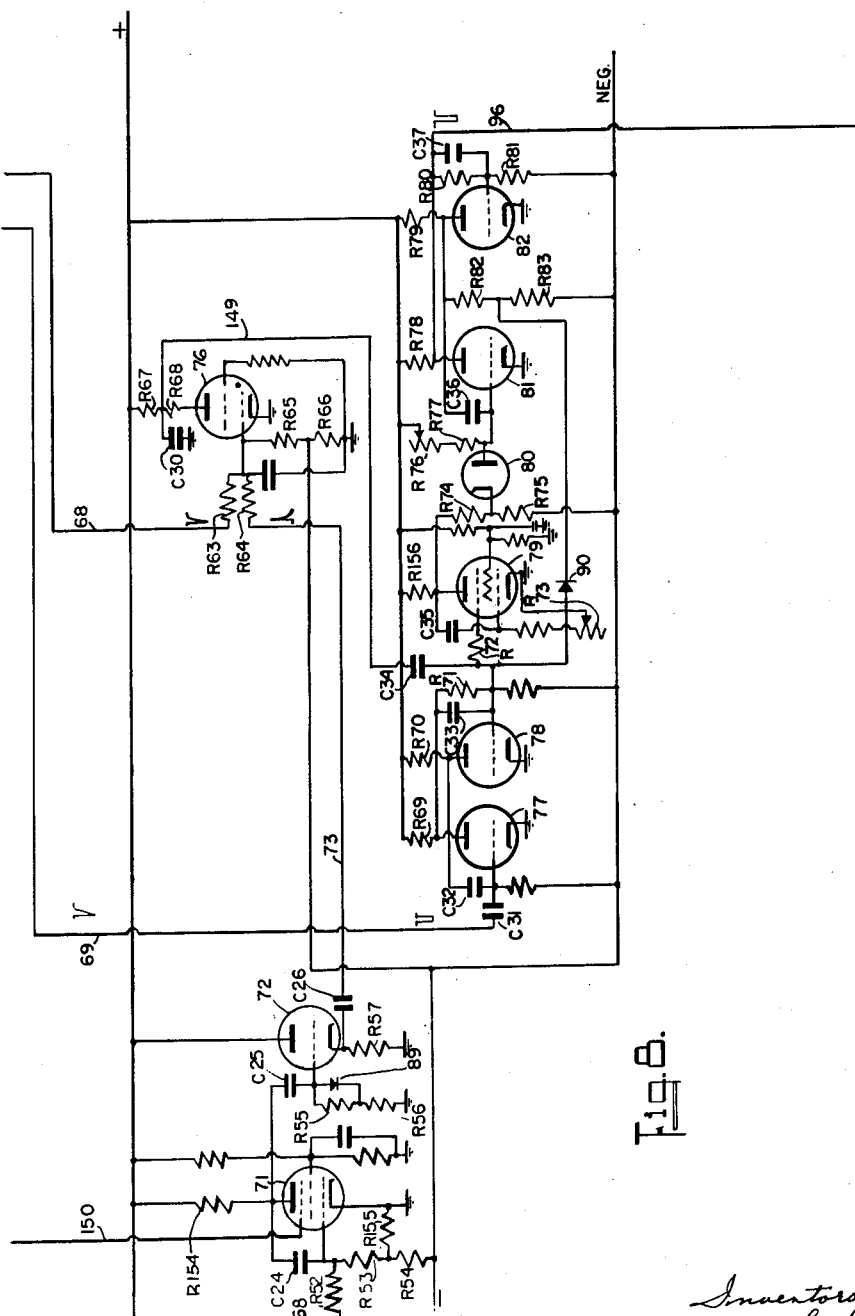

The output from the plate of pentode 135 which has the form of positive-going rectangular pulses of relatively short duration, is applied to the plate of diode 137 through voltage divider comprising R49 and R50, the top end of this divider being positive and the bottom end being connected to the negative supply. The cathode of diode 137 is connected to lead 168 and is held at a slightly negative voltage equivalent to the bias on the grid of following stage pentode 71 (FIG. 8). Since the voltage at the midpoint of the divider R49, R50 is considerably more negative than at the cathode of diode 137 in the "at rest" condition of the SSM, diode 137 isolates the SSM circuit from the grid circuit of pentode 71. When the SSM circuit is triggered over, the plate of diode 137 goes positive and the diode conducts. Its cathode follows the plate voltage, applying a positive-going voltage to the cathode end of the load resistor R52.

Pentode 71 is connected in a typical Miller integrator circuit. The suppressor grid of pentode 71 is connected to the same pulse source as is the suppressor grid of the equivalent Miller integrator stage 59 in the area evaluation circuit. This circuit as has been previously described provides that pentode 71 can draw plate current only when the voltage on its suppressor grid is near zero. For more negative suppressor potentials the plate current is cut off. During the cut off periods, the action of the SSM formed by tubes 135 and 136 acting through diode 137 has no effect upon the output of pentode 71. However, during the gate pulse plate current flowing through pentode 71 produces a gradually increasing voltage across load resistor R154 (FIG. 8), and the rate at which this voltage increases depends upon the rate at which the SSM is triggered over. Condenser C24 is the feedback capacitance between the plate and grid, while resistor chain R53 and R54 connected between grid and negative supply, and R155 connected between their junction and ground, determine grid bias conditions.

At the end of the gate pulse, a voltage exists across resistor R154 proportional to the number of times that radiation bursts have caused the SSM to trigger over. When the gate pulse terminates, the plate current through pentode 71 is suddenly cut off by the fall of potential of its suppressor. The rise of voltage occurring at the plate of pentode 71 is applied as a signal pulse through condenser C25 to the grid of triode 72. Condenser C25 in conjunction with grid resistors R55 and R56 determines the duration of the positive bias state resulting on the triode grid.

Comparison of Parameters

Triode 72 is a cathode follower having cathode load resistor R57. The positive pulse applied to its grid at the end of the gate period produces a pulse of like polarity across the load, which is fed by capacitor C26 to one end of a resistor R64. The other end of the resistor is connected to the grid of a thyratron tube 76. In the nonconducting state, controlling grid bias is established by the resistor chain R65, R66 having its lower end grounded and the junction connected to negative supply. The suppressor is biased to permit the control grid to fire the tube at a predetermined rise of control grid potential. A second resistor R63 connected to the thyratron grid has its other end connected to lead 68 whereby the negative-going signal representing fragment volume is received from the plate of triode 60. The signals fed to resistors R63 and R64 are respectively negative going and positive going and are simultaneously applied at the end of the gate pulse period. If the signals are unequal, with the negative amplitude the larger, the thyratron is not fired. If on the other hand the amplitude of the positive signal representing content of radioactive substance is the larger as compared with the negative pulse signal representing volume, the tube will fire and a current will flow in the plate load comprising R67 and R68 in series. Capacitor C30 charged to supply potential when the thyratron is off, discharges into the junction, and a negative going voltage is delivered therefrom by way of lead 149 to a delay and inhibiting circuit for preventing rejection of the fragment from which the signals were derived.

It will be understood that suitable voltage levels may be assigned to each of the electrical quantities compared, and that various means may be employed to modify one or both of the pulse amplitudes representing fragment volume and the content of radioactive substance, in accordance with the ratio at which acceptance is desired.

Accept/Reject Circuits

Triodes 77 and 78 comprise a flip flop whereof 77 is normally "on." Condenser C31 is connected between the grid of triode 77 and the lead 69 on which negative-going, end-of-gate period pulses appear. On the occurrence of such pulse the FF is triggered over so that triode 78 is conducting and 77 is cut off. The grid of triode 78 is connected to the suppressor grid of pentode 79 through isolating resistor R72 so that when triode 78 is cut off, the voltage at its grid and also of the suppressor grid is negative. No plate current therefore, flows in pentode 79. When the FF is triggered over and triode 78 is conducting, the grid voltage is at or near zero, hence, plate current is allowed to flow through pentode load resistor R156.

Pentode 79 is a Miller integrator. The rate at which the plate current increases depends upon the value of condenser C35 connected between its plate and grid electrodes, and upon the value of the adjustable resistance of grid resistor R73. As space current increases due to the application of a steady positive grid voltage, the voltage at the pentode's plate drops at a constant rate. The plate of pentode 79 is connected to the cathode of diode 80 through divider R74, R75 whose bottom end is connected to the negative supply. The plate of diode 81 is held at approximately zero potential with respect to ground. The diode plate is connected to the grid of triode 81. It will be noted that resistor R77 and variable resistor R76 are connected in series between the grid of triode 81 and the plate supply voltage bus. As the voltage on the plate of pentode 79 continues to decrease a relationship of voltages will be reached at which the voltage at the junction of the divider R74, R75 passes through zero and goes negative. At this point, diode 80 conducts pulling the grid voltage of triode 81 negative tending to turn off the plate current in that stage. Triode 81 together with triode 82 and the associated circuit form an SSM. The SSM is triggered over from its initial condition when the diode conducts, so that triode 82 becomes conducting and triode 81 is cut off. Once triggered over, it remains in the triggered condition throughout an interval determined by the sizes of coupling condenser C36 and resistors R76 and R77 in series.

The plate of triode 82 is connected with negative supply through resistors R82 and R83, whose junction is connected to the grid of triode 78 of the FF by a diode 90. With triode 82 cut off, the voltage at the junction is positive and diode 90 effectively isolates triode 82 from triode 78. When the SSM is triggered over and triode 82 conducts, the junction becomes negative, so that diode 90 conducts, pulling negative the grid of triode 78, thereby returning the FF to the initial condition with triode 77 conducting and 78 cut off. No further action takes place in the FF circuit when the SSM circuit resets.

Considering, therefore, the over-all action of the circuit composed of the FF, the Miller integrator, and the SSM, with no external influence, as though capacitor C34 were removed, it will be seen that when a negative pulse is applied through condenser C31 to the grid of triode 77 the FF is triggered over; at some later period the Miller integrator triggers over the SSM which in turn resets the FF. Thus, a negative pulse is obtained from the plate of triode 81 at a predetermined time following the receipt of a trigger pulse on the grid of triode 77, the trigger pulse denoting the passage of the trailing end of the fragment past the area detector.

It will be noted that the grid of triode 78 is connected through condenser C34 to the plate of thyratron 76. Suppose that thyratron 76 fires during the period between the initial triggering of the FF and the triggering of the SSM through the action of the Miller integrator so that a negative pulse is produced at the plate of the thyratron. This negative pulse resets the FF to its initial condition preventing the Miller integrator from further action so that the SSM is not triggered. Under these circumstances, no negative pulse is produced at the plate of triode 81.

A piece of ore, in falling through the sorting zone and passing the area scanning detector initiates the delay circuit by triggering the FF, and, if thyratron 76 does not fire within a predetermined period thereafter, an output pulse is obtained from the plate of triode 81 which is fed through condenser C65 and through diode 86 and produces a negative pulse across resistor R138. Triodes 84 and 85 comprise an SSM. The "at rest" conditions are such that triode 85 is conducting and triode 84 is cut off. The negative pulse developed on the upper end of resistor R138 is applied by condenser C64 to the grid of 85 and triggers over the SSM circuit. When triggered over, triode 84 is conducting and 85 is cut off. A resistor chain of R131 and R132 is connected between the plate of triode 85 and the negative supply. The junction of the resistor is connected to the grid of triode 92. When triode 85 is conducting, the voltage at the junction is negative. Since the cathode of triode 92 is resistively connected between ground and negative supply, its voltage is also negative, due to current flowing through resistor R133 which is connected between the cathode of triode 92 and the negative supply, as well as cathode load resistor proper, R137. The negative output on the cathode of triode 92 is connected directly to the grids of thyratrons 93 and 94. These tubes are rendered non-conducting by this negative voltage. When the SSM is triggered over, and triode 85 is cut off, the voltage at the junction of R131 and R132 biases the grid of triode 92 positively which in turn produces a positive voltage at its cathode and as well, on the grids of thyratrons 93 and 94. Both thyratrons then fire.

Thyratrons 93 and 94 are supplied with A.C. single phase voltage from the power line through transformer L24, L25. The secondary L24 is center tapped and has its terminals connected with the anodes of the thyratrons to form a full-wave rectifier system. The load for the rectifier system is connected between center tap and the filament supply provided by the transformer windings L26, L27, whereof low voltage secondary L26 is center tapped to ground. The load comprises the solenoids 116 of the solenoid operated nozzles which direct the air blast for deflecting the ore in the sorting zone. Immediately the SSM comprised of tubes 84 and 85 is triggered over, current flows through the air blast control valve solenoids, turning on the compressed air. After a predetermined time, when the SSM restores to normal condition, the solenoids are released and the nozzle supply is shut off.

Referring to FIG. 6, the circuit of a photoelectric head 117 (FIG. 1) for controlling the termination of deflecting jets of fluid and hereinafter designated BTO head, is the same as that for the area detector head 111. The BTO head is so arranged that light falling on the photocell from light source tube 119 through slot 118, FIG. 1, is intercepted by a piece of ore as it falls through the deflecting region. The output from the BTO is applied through cable 202 to the main control unit, and comprises a steady state A.C. signal which decreases in amplitude while a fragment is passing between photoelectric detector 117 and slot 118. The signal output from photoelectric tube 123 in photoelectric detector head 117 whose cathode is at negative potential determined by divider R18, R19, is developed across anode load R20. The signal is amplified by being capacitively coupled to the base of transistor 124, which is biased negatively by divider R20′, R21. The collector is at steady negative potential with respect to the emitter, determined by divider R23, R24, filtered by C13. The signal across the emitter load R25 of transistor 124 is applied to the junction of capacitors C27 and C28. These capacitors with inductance L14 form a tuned circuit resonant at the frequency at which the light intensity of light source 118 varies. As previously explained, this circuit steps up the voltage obtained from the output of the BTO head and impresses the voltage on the grid of triode 138. The circuit also acts as a band-pass filter to exclude unwanted signals lying outside a small band of frequencies centered on the frequency at which the light source pulsates.

Triode 138 is a resistance-capacity coupled amplifier, whose output across plate load R146 is fed through condenser C72 and variable attenuator R147 to the grid of triode 139. The latter triode is similarly connected as an amplifier whose output across load R148 is applied through the condenser C73 to the grid end of resistor R149 of power amplifier triode 140. The plate circuit of triode 140 includes the primary winding L15 of a transformer whose secondary L16 is center tapped to ground and whose terminals connect with diodes 141 and 142. The output of this full wave rectifier appears across filter capacitor C74.

The rectifier output is passed to a low-pass filter comprising C74, the inductance L23, and capacitor C60, which is terminated by load R123.

Attenuator R147 in the preceding amplifier chain is adjusted so that the output voltage of the full-wave rectifier is at a level below the limiting value at which any portion of the amplifier system overloads. As an ore fragment passes between slot 118 of light source 119 and the BTO head, the voltage accross load R123 at first decreases and then returns to a steady voltage when the piece of ore has gone past. The voltage across R123 is differentiated by capacitor C61 and the differentiated signal is applied to the grid of pentode 83, whose grid resistor comprises R124 and R125 in series to ground. Due to the differentiating action, a negative-going signal is produced at the pentode grid as an ore fragment causes reduction of the amount of light falling on the BTO head, while a positive-going signal is produced when the ore fragment no longer shadows the BTO head. Since pentode 83 is normally held at cut off by a negative voltage supply to the bottom of R124, due to current flowing through resistor R125 due to resistor R125' connected from the negative supply to the junction of R124 and R125, the negative-going signal produces no output. The positive-going signal, however, causes pentode 83 to conduct.

The plate of pentode 83 is directly connected to the plate of triode 85. It will be recalled that triode 85 is connected in an SSM circuit with triode 84, which when triggered over, causes the thyratrons operating the blast control valves to be turned on. This SSM circuit is capable of restoring itself after a delay determined by its own RC time constant. A pulse of current through pentode 83 before the end of the delay will also reset the SSM circuit. The thyratrons controlling the air blast are therefore turned off under normal circumstances simultaneously with the detection of the passage of the trailing edge of an ore fragment in the sorting zone.

*Sequence of Operation Throughout the Sorting System*

Tracing now the sequence of operation of the sorter with reference to the time/waveform diagrams of FIG. 3, consider first the handling of a piece of ore 100 which contains sufficient radioactive material to be accepted for processing. As the fragment falls from the belt 102, in FIG. 1, and slides over the shield 103, it will reach the slot 110 behind which is mounted the area scanning light source 112. As the ore interrupts the light falling on the area detector head 111 the A.C. signal output therefrom is correspondingly reduced. The A.C. output from the amplifier system is rectified by full-wave rectifier comprising diodes 57 and 58 so that the voltage between the top end of resistor R96 and ground is approximately zero for the uninterrupted light beam state. This voltage condition is as shown in FIG. 3, at position 230. It will be recalled that the output from the rectifier itself is negative and that the voltage produced by the rectifier is opposed by a positive voltage fed in series with the system from potentiometer R95. A reduction in the light falling on the area detector head causes the voltage between the top end of resistor R96 and ground to go positive, as shown at position 231. Squaring circuit comprising tubes 61 and 62 is fed by the voltage from the rectifier. The output voltage on the plate of triode 62 as a piece of ore is interposed in the detection beam is shown at position 232. The trailing edge of this waveform produces a trigger pulse which is fed to the SSM composed of triodes 64 and 65. When the voltage on the plate of triode 62 goes positive, as shown at position 232, a trigger pulse is produced through pentode 63 which triggers over the FF composed of tubes 66 and 67, as shown at position 233. When the SSM triggered by the negative-going output from the plate of triode 62 resets as shown at position 234, the FF is also reset as indicated at position 235. During the period when the voltage on the grid triode 66 is at or near zero, the area integrating pentode 59 and the pentode 71 which integrates the counts from the scintillation head are permitted to function. The voltage at the plate of area integrating tube 59 is shown at position 236 when the gate resets as shown at position 235, and a negative pulse is produced at the plate of triode 60 as shown at position 237. The voltage at the plate of pentode 71 is shown at position 238. At the end of the gate period, the voltage on the plate of pentode 71 returns to the supply voltage potential, thereby producing an output pulse from the cathode of triode 72 which is proportional in amplitude to the number of pulses produced by the scintillation crystal during the gate time. The output from the cathode of triode 72 is shown at position 240. The output from the plate of triode 60 and the cathode of triode 72 of opposed polarities, are combined through the resistor network in the grid of the thyratron 76, and since the output from the cathode of triode 72 is greater in amplitude than that of triode 60, a positive pulse results on the thyratron grid. This positive pulse is indicated at position 241. As a result of the positive net signal on the grid, the thyratron will fire. The thyratron output pulse from its plate circuit is shown at position 242.

The negative signal from the plate of tube 63 triggers over the FF in the delay circuit causing triode 78 to become conducting. The voltage on the grid of triode 78, therefore, goes positive as shown at position 243. As soon as this voltage goes positive, Miller integrator pentode 79 begins to conduct. The voltage at its plate is shown at position 244. The pulse from the plate circuit of thyratron 76 resets the FF as indicated at position 245. The Miller integrator is also reset at this point so that the voltage on the plate of pentode 79 never reaches the pick-off voltage as indicated at position 246. No further circuit action then takes place and the air blast is not turned on allowing the ore to fall through to the accept bin indicated as 105 in FIG. 1.

As a second example, consider the action of the sorter for a piece of ore 100 which has insufficient radioactive material compared to its volume to warrant chemical processing. As the piece of ore proceeds through the area scanning zone, exactly the same action takes place in the circuit as previously described for the acceptable piece of ore. Instead of the waveform on the plate of pentode 71 being that shown at position 238, the waveform will be similar to that shown at lower position 247. At the end of the gate period, the positive pulse on the cathode of triode 72 will be much smaller than before as shown at position 248. Since the negative pulse on the plate of triode 60 is larger than the positive pulse on the cathode of triode 72, the combining of these pulses produces a net negative pulse on the grid of thyratron 76. This resultant is shown at position 260. Since the thyratron does not respond to a negative-going pulse, no reset action takes place and the voltage on the plate of pentode 79 continues to decrease until the pick-off voltage is reached as shown at position 251. When the pick-off voltage is reached, the SSM comprising tubes 81 and 82 is triggered over by current through the pick-off diode 80. Triggering over the SSM results in a positive-going signal appearing at the plate of triode 81 as shown at position 252. When the SSM resets, the voltage on the plate of triode 81 goes negative as shown at position 253. The resulting signal is used to trigger the SSM composed of triodes 84 and 85. Triggering over this SSM results in a positive signal appearing at the cathode of cathode follower 92 as shown at position 254. This positive voltage acting on the grids of thyratrons 93 and 94 allows current to pass through these tubes and hence to energize the solenoids 116 of the valves of air nozzles 115, turning on the air blast.

As the piece of ore continues to fall, it eventually interrupts all or a portion of the light falling on BTO head 117 of FIG. 1, from slot 118 of light source 119. The resulting reduction in the A.C. output of the BTO head results in a decrease in the positive output voltage from rectifiers 141 and 142 as shown at position 255. When the piece of ore passes through the air blast area and the intensity of light reaching the BTO head is restored to normal, the voltage output from the rectifier comprising diodes 141 and 142 is restored to normal as shown in position 256. This waveform from the rectifier is applied through the differentiating circuit to the grid of pentode 83. A negative pulse is thus produced when the piece of ore enters as shown at position 257 and a positive pulse occurs when the piece of ore leaves. Since pentode 83 is biased to cut off, the negative pulse has no effect but the positive signal on the grid produces a momentary pulse of plate current through pentode 83 which resets the SSM comprising triodes 84 and 85 as shown at position 260. When the SSM is reset, the current through thyratrons 93 and 94 is cut off de-energizing the solenoids in the air valves and turning off the air blast.

It will be apparent therefore that the air blast is turned on for a period commencing with the arrival of a pulse through the delay circuit, which in turn was initiated by the interruption by the piece of ore of the area detector beam. This delay is such as to allow the piece of ore to fall the distance from this beam to the air blast nozzle position during the delay period. The air blast therefore acts on the piece of ore as it arrives in front of the nozzles. With suitable pressure the blast changes the trajectory of the ore while the fragment is falling through the air blast. The detection of the passage of the trailing end of the piece of ore by the BTO head automatically turns off the blast. The new trajectory of the piece of ore causes it to land in the reject bin 107.

*Alternative Blast Turn-Off Control*

In the foregoing description, a method has been described for turning off the air blast by using a duplicate light source and detector disposed at the lower end of a sorting zone so as to detect the passage of the trailing end of an ore fragment and to produce a control signal therefrom. This signal is used to turn off the blast. An alternative method for turning off the blast does not require an additional light source and detector, and substitutes in lieu thereof a circuit for producing a signal as the fragment leaves the area scanning position at the upper end of the sorting zone. The signal produced by this event is used to trigger a delay circuit which produces a blast turn off signal at the proper time to shut off the air control valves as the fragment falls below their influence. In a sorting system employing this alternative method, the turning on of the blast is controlled in the same manner as described hereinbefore by a signal produced as the ore enters the area detecting position, triggering a delay circuit which turns on the blast at the appropriate time. The blast is turned off however, not as in the previous system, but by a signal produced as the piece of ore leaves the area scanning beam, triggering a delay circuit which in turn stops the blast at a time when the fragment has fallen below the blast stream.

Referring to FIGS. 10 and 11, a delay circuit comprising four SSM circuits and selected waveforms therein is illustrated. The first SSM comprises triodes 283 and 284, the second comprises triodes 285 and 286, the third comprises triodes 287 and 288, and the fourth comprises triodes 289 and 290. It will be recalled that the plate of tube 62 has on it a rectangular pulse corresponding to the time of passage of an ore fragment past slot 110. The positive going portion corresponds to the entry of the fragment into the area scanning beam and the negative going portion corresponds to the exit. The purpose of this negative-going portion in timing the comparison pulses has been previously described, and the pulse is also employed in the present modification to trigger over the first SSM through capacitor C90, over lead 70. The lead 70 is directly connected to the plate of tube 62, and capacitor C90, with the input circuit of tube 283, serves to apply a differentiated signal to the grid of tube 283. As tube 283 is normally conducting, only the negative going pulse will affect the tube. The SSM stays triggered over for a time depending on C91, the grid resistor of triode 283, and the voltage at the output of potentiometer R193. The voltage from potentiometer R193 is obtained from the plate supply through dropping resistor R192. When the first SSM resets to its "at rest" condition, second SSM comprising tubes 285 and 286 is triggered through capacitor C92. This SSM has a time constant determined by elements corresponding to those of the first SSM. When the second SSM resets the third SSM is triggered over and when the third SSM resets the fourth SSM is triggered over. Hence, at a predetermined time following the arrival of the trigger pulse, due to the sum of the "on" times of the four SSM circuits, the fourth SSM resets producing a positive-going pulse at the plate of triode 290 which is fed through capacitor C95 to the grid of pentode 83a FIG. 10.

Figure 5:
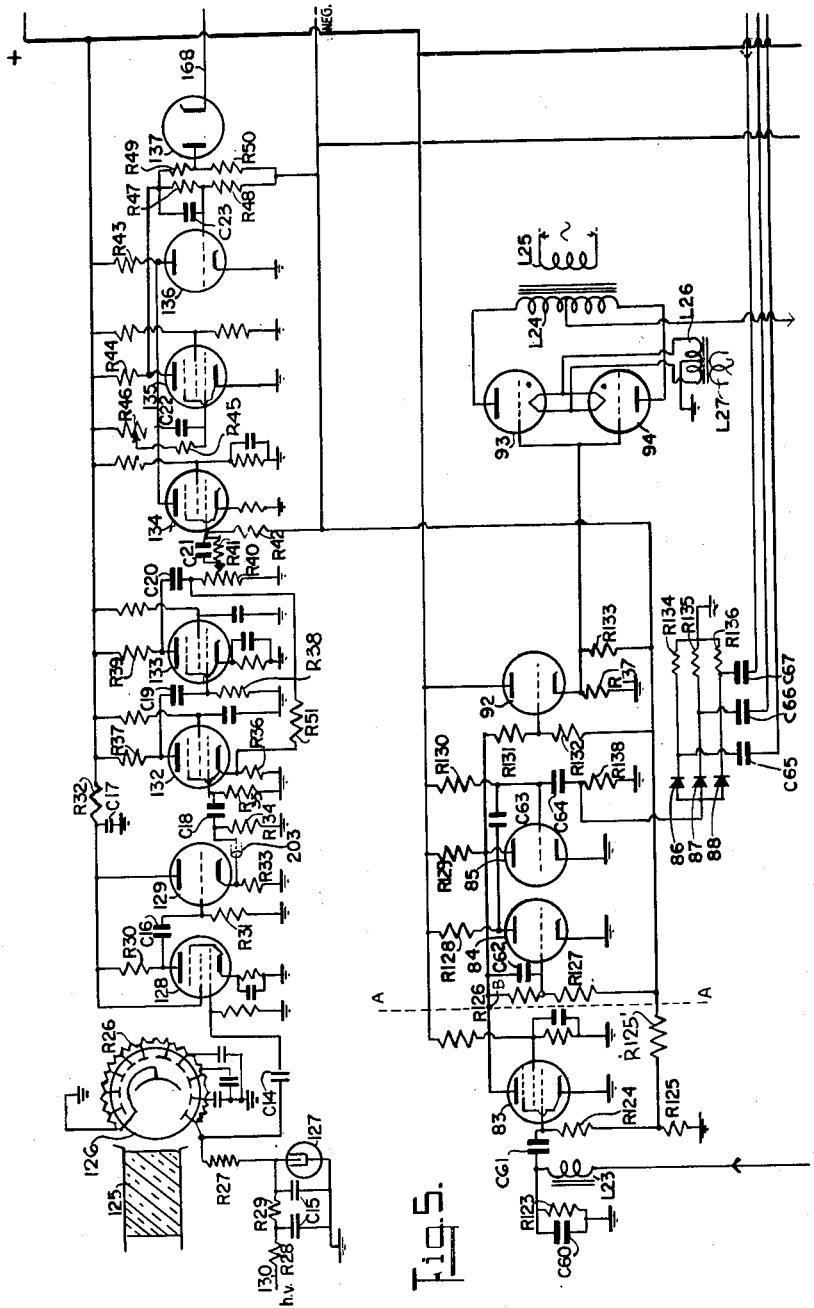

If the piece of ore initiating the trigger pulse carries less than the required amount of radio-active substance, the SSM composed of triodes 84 and 85 in FIG. 5 will have already been triggered over due to the action of the chain of stages 77 to 82 inclusive, as previously described. Since the plate of pentode 83a is directly connected to the plate of triode 85, for example at point B of FIGURE 5, the pulse of plate current through the pentode 83a resets the SSM comprising tubes 84 and 85, thereby turning off the air blast. The action of the circuit will be seen therefore to produce an output pulse at a definite time following the arrival of a trigger pulse. The length of the delay interval is adjustable by means of potentiometer R193 which affects the positive biasing of the "on" triodes of all four SSM circuits.

It will be seen that the tube 83a of FIGURE 10 serves the same purpose as tube 83 of FIGURE 5. Consequently, when the circuit of FIGURE 10 is used to turn off the air blast, the tube 83 with its associated circuitry is not required and that portion of FIGURE 5 to the left of dashed line AA is not necessary. It will also be seen that as FIGURE 10 is an alternative blast turn off circuit, the circuit is replaces would not be required in the alternative. That is, the circuit in the lower part of FIGURE 6 comprising light source tube 119, tubes 123, 138, 139, 140 and the associated circuitry is not required in the alternative.

It is to be noted that as soon as each piece of ore has left the area detecting position and the first SSM in the delay chain has reset, it will be ready to accept a succeeding trigger pulse due to the next following ore fragment. It is therefore possible to have as many as three delayed blast-turn-off signals passing through the group at any given time.

Gating Pulse Termination

The foregoing description has set out a system of cooperating apparatus wherein the comparison of an estimated volume quantity with a quantity representing measured content of radioactive substance is timed by a signal derived by the passage of a fragment through the area scanning beam. It will be recalled that a negative-going trigger pulse is produced from the output of the biased pentode 63, on lead 69, coincident with the arrival of the leading edge of a fragment in the area scanning light beam at the upper end of the sorting zone. This pulse is used as a trigger throughout the system for initiating events. In particular, the negative pulse is used to trigger over flip flop comprising triodes 66 and 67. The gate pulse, on lead 150, is timed to occur when the flip flop is reset to its initial state, by the self-restoration of SSM comprising triodes 64 and 65. However, the latter function is timed from the occurrence of a signal from squarer tube 62, representing the passage of the trailing edge of the fragment through the area scanning beam.

Ordinarily the sizes of fragments passing through the sorting zone will be limited to exclude fines and grossly large pieces. However, with certain rock types, a small percentage of the fragments discharged from a jaw crusher may remain unusually large in one dimension. If such overly long fragments pass through the zone, the occurrence of the trailing edge signal, and hence of the later gate pulse, will be so delayed that the blast inhibiting control chain comprising stages 77, 78, 79, 80, 81 and 82 will have signalled the blast control thyratrons to reject the fragment. This will be readily understood by considering that a reset pulse, ordinarily produced from thyratron 76 as a result of a satisfactory comparison, does not prevent diode 80 from conducting within a predetermined period after integrator 79 begins to increase its plate current.

Figure 7:
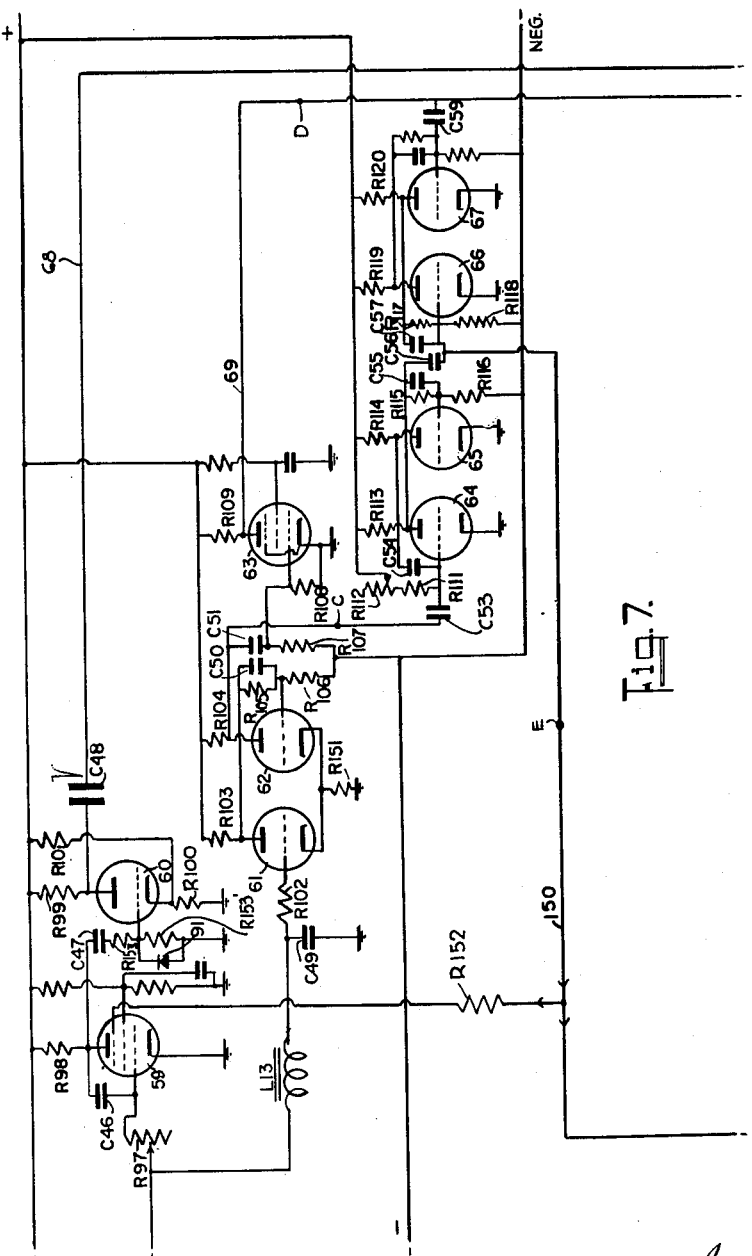

In the embodiment of FIG. 13, there is associated with the flip flop comprising triodes 66 and 67, and the SSM comprising triodes 64 and 65, a further SSM comprising triodes 153 and 154. The latter SSM, which may be labelled by its function as "long fragment override" SSM, resembles the circuit of triodes 64 and 65, wherein stage 153 is normally conducting in the stable state. It will be seen that this SSM is connected between the flip flop and the SSM comprising triodes 64 and 65, and coupling capacitor C56a from the plate of triode 64 is connected to the grid of "off" stage 154. It will be recalled that previously the coupling capacitor C56 coupled the plate of triode 64 to the grid of tube 66 of the flip flop (FIG. 7). The output of the SSM, taken from the plate of stage 153, is capacitively coupled by capacitor C84 to the grid of flip flop triode 66.

The circuit of FIGURE 7 comprising tubes 64, 65, 66 and 67 can, for a discussion of the FIGURE 13 embodiment, be replaced between the points indicated as C, D and E (FIGURE 7) by the FIGURE 13 circuit with similarly indicated points.

When fragments of normal length are passing through the zone, the operation of the embodiment of FIG. 13 is substantially that of the embodiment of FIG. 7. The self-restoration time interval for the long fragment override SSM is adjusted by variable potentiometer R187, so that this circuit does not pass a pulse through capacitor C84 unless a certain time has elapsed after the arrival of the trigger pulse applied to stage 153 through capacitor C83. As stages 153 and 154 reverse to respective cut-off and fully-conducting states, a positive pulse is applied through capacitor C56a to the plate of stage 64 and through capacitor C84 to the grid of stage 66. Since stage 64 is fully conducting, the pulse is partly attenuated by R189, and has no effect on stage 65. Since stage 66 is simultaneously triggered over to fully conducting state, a positive pulse on its grid is also without effect. Eventually, stage 153 becomes fully conducting, producing a negative pulse on its plate. The negative pulse is passed by capacitor C84 to conductor 150, and therefore produces a substitute gate pulse in the absence of operation of SSM comprising triodes 64 and 65.

In the event that the trailing end of a fragment passes through the area scanning beam before the restoration time of the long fragment override SSM, the negative-going output from squarer stage 62 cuts off stage 64 so that a positive pulse appears on capacitor C56a, as stage 65 becomes fully conducting. Since triode 154 will inherently have been also made fully conducting previously, the pulse is without effect. When the stage 64 restores, the negative pulse passed by capacitor C56a cuts off stage 154 as well as stage 65, so that a negative pulse appears as stage 153 becomes fully conducting.

Accordingly, it will be seen that the gate pulse is generated either from the output of the long fragment override SSM or the SSM of FIGURE 13 comprising stages 64 and 65, depending upon whether the restoration time of the former is less than the time for the trailing end of the fragment to appear in the area scanning beam. The restoration time of the long fragment override SSM is adjusted to be shorter than the time between the triggering of flip flop stage 77 and the occurrence of the negative pulse on the grid of stage 81 due to integrating action of stage 79.

Sorting System Handling a Plurality of Fragments Within Sorting Zone

In a modification of the deflection control circuit of FIG. 8, whereby substantially only a single fragment is passing through the sorting zone at any moment, the system may be made to handle several fragments simultaneously moving in succession between the upper and the lower limits of the sorting zone. The circuit diagram of the portion of the system so modified is illustrated by FIG. 9, which is to be read in conjunction with the other circuit diagram figures in lieu of FIG. 8.

Since a sorting system as hereinbefore described is capable of estimating volume and content of radioactive substance for fragments varying widely in all dimensions, and since the speed of the system is adequate so that the deflection system will effectively resolve between closely spaced fragments of the smaller sizes, a great increase in tonnage handled per hour may be gained when dealing with small sized ore fragments by employing such modified system.

In practical systems, where the length dimensions of fragments handled may range between two inches and twelve inches, the vertical extent of the zone would be dimensioned to handle the largest pieces. Consequently, if the fragments are spaced so that the centers of mass of consecutive fragments are separated by approximately twelve inches, as would be required for single fragment handling, the throughput per hour would be a fraction of the ultimate sorting capacity of the system if a constant minimum spacing could be employed between fragments.

In the present modification, a negative trigger pulse is generated as previously described coinciding with the interruption of the area scanning beam by the leading edge of a fragment. As the trailing edge leaves the scanning beam, another pulse is produced, which is lengthened by an interval such that the trailing edge of the fragment has time to pass below the radiation detection zone, and a timing pulse, namely, the "gate" pulse hereinbefore referred to, is produced at this time. An electrical signal representing the estimated volume of the fragment appears on lead 68 from FIGURE 7, simultaneously with the appearance of a second quantity representing measured content of radio-active substance in the fragment, on lead 168 from FIGURE 5, as hereinbefore described.

Whereas in the single fragment system previously described, a single comparing unit, namely thyratron 76, was described, the modified system may employ two or more comparison stages and their associated deflection control stages. While the system herein described is shown as having three separate analysis and control groups, it is to be understood that this number is merely exemplary and in no way limiting. For example, more than three groups of comparison and control stages may be employed where the length of the sorting zone and the range of fragment lengths would permit more than three fragments to appear within the vertical extent of the zone at any one time. However, it must be pointed out that since the vertical extent of the radiation detecting zone will ordinarily be limited by considerations of fragment velocity and fragment size as well as cost of detection equipment, a large number of control groups may not be warranted.

Each of the comparison and deflection control groups are constituted by tube devices such as 76, 77, 78, 79, 80, 81, and 82, as previously described with reference to FIG. 8, for example, the second group includes a like complement of stages 176 to 182 inclusive, and the third group includes the stages 276 to 282 inclusive. In a similar manner, each of the associated circuit elements such as capacitors and resistors bear the same numerical relationship to their counterparts among the respective groups.

It will be seen that lead 68, carrying the estimated volume pulse, is connected to an end of resistors R63, R163, and R263, whose other ends are connected with the control grid of respective thyratron comparer stages. Similarly, the lead 168 carrying the positive-going pulse representing radioactivity content is connected to the ends of resistors R64, R164, and R264, whose other ends are also connected with the thyratron control grids. Each thyratron grid is connected to ground by a resistor chain for example R65, R66, whose junction is connected to negative supply to bias the grid negatively. The suppressor grid of each is connected to a gating circuit, in series with respective resistors R197, R198 and R199. Ordinarily, the bias on suppressor grids is so arranged that only one of the group has sufficiently positive suppressor bias to permit it to operate in response to the arrival of pulses over lead 68 and 168. When the suppressor potential on a thyratron is low, no conduction is possible regardless of signal conditions on its grid. When the suppressor potential is sufficiently positive, conduction in the thyratron is controlled by the negative bias normally existing on its grid, unless a positive-going signal of sufficient amplitude to overcome the grid bias is supplied. As described above, if the positive-going signal on lead 168 is sufficiently greater than the negative-going signal on lead 68, that thyratron which is permitted to fire by the voltage conditions existing at that time on its suppressor grid will fire.

The potentials on the suppressor grids of the comparison circuit thyratrons are determined by circuit conditions in the stages comprising triodes 183, 184, and 185. These tubes are so interconnected that only one of them is conducting at a given instant. The suppressor control group has three stable states, or in other words, stable conditions exist with any one of the three tubes conducting. On following through the interconnections between stages, it will be noted that the grid of triode 183 is connected through diodes 186 and 187 to the central point of a resistor R159, and of resistor R162. The former resistor is connected between the plate of triode 184 and negative supply. Resistor R162 is similarly connected between the plate of triode 185 and negative supply. Assuming that triode 183 is conducting and that the other two triodes are cut off in the ring of three, the voltage at the output of resistors R159 and R162 will be slightly positive with respect to ground. Since the grid of triode 183 is returned to the positive supply through resistor R184, its grid voltage will be slightly positive and grid current will flow in this triode. The grid of triode 184 is connected through diode 189 to the center tap of resistor R161 which is connected between plate of triode 185 and negative supply. The center point of this resistor will be positive since triode 185 is non-conducting and the voltage at its plate is therefore substantially plate supply voltage. The grid of triode 184 is similarly connected through diode 188 to the center tap of resistor R158 connected between the plate of triode 183 and negative supply. Since triode 183 is conducting, the center tap of resistor R158 is negative. Since diode 188 conducts in such a direction as to pull the grid of triode 184 negative, the latter will be biased to cut off despite the fact that diode 189 is also connected between its grid and a source of slightly positive voltage. By virtue of similar interconnections and bias states produced, triode 185 is held at cut-off. By the use of the several diodes, the potential at the midpoint of a resistor connected with a tube grid exerts control, so that in order for a tube to be made conducting, it will be seen that its grid must be connected to center points of resistors at which a positive potential with respect to ground exists.

If a negative trigger pulse is fed simultaneously as on lead 69, to all of the grids, only that triode which was conducting will change its state and thereby produce a positive-going pulse at its plate. It will be observed that each triode plate is connected to the following triode grid in the ring of three through a coupling capacitor. The plate of triode 183 is connected to the grid of triode 184 through capacitor C78. The plate of triode 184 is connected to the grid of triode 185 through capacitor C79. The ring connection is completed by capacitor C80 connected between the plate of triode 185 and the grid of triode 183.

The negative trigger pulse, coincident with the entry of the leading edge of a fragment in the area scanning beam, is applied by lead 69 to each of the triode grids, respectively by capacitors C75, C76, and C77. The only stage affected is triode 183, at whose plate a positive pulse will appear as stated above. This positive-going pulse overrides the smaller negative trigger pulse fed to the grid of triode 184 and causes that triode to become conducting. The change of state of triode 184 determines that triodes 183 and 185 are now cut off. The circuit therefore settles in a new state of equilibrium with only triode 184 conducting. The same progressive change of state will occur each time a negative trigger pulse, indicating the entry of another fragment into the sorting zone, is fed to the triode grids. Each triode therefore conducts in turn and three pulses are required to be fed before the same triode conducts again.

Each deflection control group of stages, for example 77 to 82 inclusive, has its functions initiated by the arrival of a negative-going pulse at the grid of that triode of the pair of triodes comprising a flip flop which is normally conducting. It will be seen that the flip flop stages 77, 177 and 277, have their grids coupled with the plates of the ring of three triodes 183, 184 and 185, by capacitors C31, C131, and C231, respectively. Let it be assumed that the states of the system are such that the arrival of a negative trigger pulse on lead 69 cuts off conducting stage 185, and transfers the conduction state to triode 183. Accordingly, a negative pulse will appear on C31, which will reverse the flip flop comprising triodes 77 and 78, allowing the latter to be conducting. Since current flow through resistor R184 and diodes 186 and 187 is opposed by positive potentials at the midpoints of resistors R159 and R162, the potential of suppressor on thyratron 76 rises to a value sufficient to permit conduction, if the control grid were not biased negatively. On the occurrence of the later timing pulse which initiates the comparison operation, the control grid of thyratron 76 will be made positive if the fragment falling through the sorting zone has sufficient content of radioactive substance. Therefore, a negative-going pulse will appear at the junction between series resistors R67 and R68 in the plate circuit. This pulse will be passed by capacitor C34, to restore the flip flop by cutting off stage 78. It will be seen by simple inspection, that an identical circuit relation exists for each of the control groups, so that flip flop 177, 178 can be reset by thyratron 176 and similarly flip flop 277, 278 may be reset by a pulse from thyratron 276. Each resetting pulse is applied also to the suppressor grid of the Miller integrator stage, for example stage 79 associated with the first control group.

In the event that flip flop triode 77 was made non-conducting to initiate the control action, and the comparison at the control grid of thyratron 76 did not result in producing a negative resetting pulse on capacitor C34, the cathode potential of diode 80 will progressively decrease until SSM comprising triodes 81 and 82 is triggered over, producing a negative-going pulse at the plate of triode 81. In a similar manner, any other control group making a similar comparison would yield a negative pulse from the anode of triode 181, or from the anode of triode 281. Referring additionally to FIG. 5, it will be noted that the corresponding negative-going pulses are passed respectively by capacitors C67, C66, or C65, and applied to the terminals of resistors R136, R135, or R134, whose other terminals are grounded. The diodes 88, 87, and 86 are connected with each capacitor so as to lower the potential of the upper end of resistor R138 when a negative pulse appears without interacting with any other of the SSM circuits.

It will be seen therefore, that the occurrence of a negative pulse on lead 69, coincidentally with the entry of the leading edge of a fragment in the area scanning beam, allocates a deflection control circuit for subsequent acceptance or rejection of the fragment, by triggering over one of the flip flops, and preparing an associated thyratron to make the comparison. The ring of three is advanced when an ore fragment enters the scanning area. One of the thyratrons 76, 176 or 276 is made ready to accept comparison signals on leads 68 and 168 by the reduction in the negative potential on the suppressor grid of the thyratron to near zero. If the comparison signals on leads 68 and 168 have values such that the potential on the grid of the readied thyratron falls sufficiently towards zero to permit the thyratron to fire, a momentary pulse of anode current is drawn by the thyratron which pulse produces the turn off signal in the corresponding delay circuit. The thyratron immediately ceases to conduct since the anode load resistor is of too high a value to permit continuous conduction. The advent of the next negative pulse on lead 69 advances the ring of three one more step and so the action continues.

In this description of a modified sorter system capable of handling a plurality of fragments within the sorting zone, detailed reference has been made to one method of information storage. Those skilled in the art will be aware that various other forms of memory or storage systems may readily be substituted and achieve the same results. For instance, a magnetic device in the form of a drum or tape may be used to retain data or instructions regarding a plurality of fragments simultaneously moving through the sorter zone, suitable read out apparatus serving to extract this information when required.

In the foregoing description there have been set forth arrangements of apparatus for the estimation of area or volume of a body, for the measurement of a radiation field associated with the body, and for the deflection of the body along a path of movement in accordance with a determination made by comparing the estimated and measured quantities. It has been pointed out that the cubic volume of a body may be approximately determined by obtaining the length dimension of the body, by obtaining the integral of the projected area of the body, or by a double integration method involving the determination of projected areas on planes at right angles to each other. It is to be understood that for practical accuracies, any one of these methods may be useful depending on circumstances.

It is also to be understood that optical monitoring apparatus as hereinbefore described may be utilized independently of any detection of a field associated with the body, for example, fragments may be sorted according to size by substituting in comparison circuits according to the invention, electrical quantities of arbitrary magnitude in lieu of any measured quantity denoting the content of a constituent, whereby to achieve sorting on the basis of whether a given fragment is larger or smaller than a given standard. Moreover, while the foregoing description has dealt mainly with determination of the content of a radioactive constituent of fragments, the method according to the invention is not limited to penetrative radiation fields associated with fragments, but may be employed with respect to various other energy fields such as magnetic fields, reflected radiant energy fields, and reflected sound energy fields.

We claim:
1. In a system for sorting material fragments according to the intensity of an energy field detectable remotely from said fragment, said intensity being substantially related to the volume of a constituent dispersed in said fragment, said system comprising a section constituting a vertically extending sorting zone, fragment handling means for introducing fragments into the upper part of said zone for substantially free fall therethrough, a light source and a light detector spaced apart across said zone and effective to derive a first signal proportional to the size of each said fragment, a detector responsive to the intensity of said energy field positioned adjacent said zone and effective to derive a second signal proportional to the detected intensity, means to compare said first and second signals and to derive a third signal having a magnitude related to the difference of said first and second signals, means responsive to the entry of said fragment into said zone to produce a fourth signal delayed with respect to time of said entry, a fluid nozzle having a control for fluid flow therethrough, said control being responsive to said fourth signal to initiate a fluid stream for impingement upon said fragment for a predetermined period at a predetermined time after movement of said fragment into said zone to deflect said fragment from its path, and means responsive to said third signal to inhibit said control and prevent fluid flow in said nozzle when said third signal exceeds a predetermined value.

2. A system as in claim 1 including a further detector for optically determining the completion of passage of a fragment through the zone, and means responsive to said further detector for terminating said period of flow of the fluid stream.

3. In a sorting system for accepting or rejecting ore fragments on the basis of percentage content of radioactive substance, the combination of a conveyor means for dropping fragments in sequence for passage with at least a minimum velocity through a section constituting a sorting zone, a source of radiant energy to which the fragment is opaque disposed lateraly of the path of fall of fragments in said zone, a stationary screen having a horizontally elongate narrow slot therein disposed between said zone and said source, detector means responsive to radiant energy emitted over the area of said slot spaced horizontally across said zone from said slot effective to produce a signal whose magnitude is proportional to length of slot occulted by a fragment, means for integrating said signal to produce a first signal quantity representing cross-sectional area of a falling fragment, a detector for penetrative radiation disposed adjacent the path of fall of the fragment, effective to measure the radioactivity of fragments moving through a predetermined vertical distance in said zone, means for deriving a second signal quantity proportional to the integral of instantaneous energy of detected penetrative radiation over a time interval of fragment passage through said predetermined vertical distance, a nozzle for initiating a fluid jet transversely of said zone disposed adjacent the lower part thereof, and jet control means responsive to a predetermined relationship of magnitudes of said first and second signal quantities effective to initiate said jet for deflection of said fragment when said radioactive substance content is less than a predetermined amount.

4. In a sorting system, the combination of a section constituting a vertically extended sorting zone, fragment handling means for introducing fragments for free fall into the upper part of said zone, optical monitor apparatus comprising a transversely elongated source of illumination and a photoelectric detector in opposed spaced relation to said source whereby the free fall of said fragments passes between said source and said detector and is effective to produce a first signal quantity substantially proportional to the size of a fragment, radiation monitoring apparatus effective to derive a second signal quantity as a function of a physical field associated with said fragment due to a constituent of the fragment, means to compare the second quantity with the first quantity to establish a third quantity representing a variation of the concentration of the constituent from a standard, a fluid nozzle at the lower end of said zone, a source of fluid under pressure connected with said nozzle, and fluid flow control means responsive to said third quantity effective to initiate a fluid stream for impingement upon the fragment to deflect it from its path when said third quantity varies below said standard.

5. A system as in claim 4 wherein said transversely elongated source of illumination comprises a light source with a fixed area transverse slot collimating said light source, and said first signal quantity is directly proportional to the transverse length of slot shadowed from said light source by a fragment.

6. A system as in claim 4 further including a plurality of storage channels effective to retain information regarding a like plurality of fragments simultaneously moving in succession between the upper and lower limits of said sorting zone.

7. A system as in claim 4 wherein said radiation monitoring apparatus comprises a detector for gamma radiation generated by a radioactive constituent of a fragment, disposed adjacent the path of fall of the fragment and effective to receive at least a part of the radiation energy emanating from the fragment.

8. A system as in claim 4 wherein said third quantity is zero for predetermined magnitudes of said first and said second quantity and said control is adjusted to initiate said fluid stream when said third quantity is greater than zero.

9. Apparatus for sorting solid bodies of irregular outline according to intensity of an energy field detectable remotedly from said body, said intensity being substantially related to the volume of a constituent dispersed in the body, comprising a conveyor for dropping the body in substantially free fall, a light source, a transversely extending narrow aperture illuminated by said source, a light detector spaced from said aperture on the side thereof opposite said source, said detector and said aperture defining a horizontal plane intersected by said path, means for generating a first signal proportional to the time integral of occulted area of said slot over a time interval at least equal to the passage time of a body through said beam, an energy field detector disposed adjacent to said path effective to measure intensity of said field, means for generating a second signal proportional to the integral of detected field intensity, means to compare predetermined multiples including unity of said first and said second signals, means to derive a third signal having a magnitude related to the difference of said first and second signals, deflecting means operable to deflect said body from its free fall, and control means responsive to a predetermined magnitude of said diffierence to operate said deflecting means.

10. Apparatus as in claim 9 wherein said energy field is penetrative gamma radiation energy emanating from a radioactive constituent of said body and said first and said second quantities have opposite sign.

11. Apparatus as in claim 9 wherein said deflecting means comprises a blast nozzle for directing a fluid jet transversely of the free fall path of the body after it has passed the field detector, and said control means includes delay means arranged to terminate said jet at a predetermined time after the generation of said first signal.

12. The combination with powered conveyor means and a stationary discharge chute for launching solid fragments at time-spaced intervals into free fall trajectories, of optical scanning elements for determining projected areas of individual falling fragments, said scanning elements comprising at least one stationary light source and associated light detector means illuminated thereby and being spaced apart transversely of paths of fall of said fragments, one of said scanning elements having a horizontally elongate aperture at right angles to said spacing and having a vertical extent which is a small fraction of its horizontal dimension whereby said detector means produces an elemental area signal whose magnitude at any instant is proportional to the projection on said aperture of the breadth of an incremental fragment volume contained in a scanning zone between said elements, circuit means responsive to the entry of a fragment into said zone and to the passage of a fragment from said zone to produce first and second timing signals respectively, and energy field monitoring elements disposed adjacent paths of falling fragments to produce a signal whose magnitude is proportional to instantaneous influence by energy fields detectable within a predetermined space about a fragment, means to produce a third timing signal delayed with respect to said first and second timing signals, first integrating means for summing the elemental area signals for each fragment as a first electrical quantity, second integrator means for summing the energy field signal for each fragment as a second electrical quantity, a comparison circuit, means responsive to said third timing signal to apply said second quantity simultaneously with said first quantity for comparison by said comparison circuit, a fluid discharge nozzle disposed below said zone for controllably jetting fluid transversely of said paths for fall, and control means responsive to said comparison means for impinging fluid against a fragment when said comparison determines a predetermined relationship between said quantities.

13. The combination of claim 12 including two pairs of scanning elements each pair comprising a stationary light source and associated light detector means, and wherein the light source and light detector of one pair of elements are spaced apart at right angles with respect to the light source and detector elements of the other pair, all said elements lying within a common plane substantially transverse to the paths of movement of falling fragments.

14. The combination of claim 12 wherein said first integrating means is arranged to sum the product of instantaneous elemental area signals produced by each light detector.

15. Apparatus for estimation of fragment volume comprising a section constituting a vertically extended sorting zone, conveying means for introducing a fragment into the upper end of said zone, means to release a fragment for free fall through the zone, optical scanning means comprising a light source and a detector illuminated by light from said source and spaced therefrom across said zone, said source and said detector having masking apertures parallelly aligned and opposed to define a horizontal scanning beam having a vertical extent which is a small fraction of its lateral extent, said detector generating a signal whose magnitude is proportional to the projected breadth of the fragment along its intercept by said beam, means to produce a first pulse when a fragment enters said beam, a timing circuit for producing a second pulse delayed with respect to said first pulse, means to derive a third pulse when the fragment leaves said beam, a timing circuit for producing a fourth pulse delayed with respect to said third pulse, an integrating circuit fed by said signal commencing with entry of said fragment in said zone, and means generating a sum output pulse from said circuit timed with respect to said third pulse.

16. Apparatus as in claim 15 further including a second optical scanning means comprising a second light source and a second detector spaced apart across said zone to form a second horizontal scanning beam orthogonally intersecting said first scanning beam, and wherein said signals are combined by analogue multiplier means to produce an instantaneous product signal representing incremental volume of the fragment cross-section intercepted by said beams, and said integrating circuit is fed by said product signal.

17. Apparatus as in claim 16 wherein said sorting zone further comprises an air-blast deflecting means disposed below said beam controllable in accordance with said sum pulse to allow a blast of air to be directed transversely of said zone when the magnitude of said sum signal bears a predetermined relationship to a reference magnitude, the initiation and shutting off of said blast being controlled by said second and fourth pulses respectively.

18. Apparatus as in claim 15 including a comparison circuit, means applying said sum signal and a reference signal to said comparison circuit simultaneously, and means to deliver an output comparison pulse when said sum signal is greater than said reference pulse.

19. Apparatus as in claim 18 including a detector circuit producing said reference signal and comprising a scintillation counter generating a signal related to the radioactivity of said fragment while moving in said sorting zone and an integrator for summing instantaneous detected signals commencing with the entry of said fragment and concluding with the occurrence of said sum output pulse.

20. Apparatus as in claim 18 further comprising a plurality of storage channels, a like plurality of comparison circuits, a ring circuit comprising a like plurality of transfer elements one of which is in conducting state, means responsive to the passage of a fragment through said beam for actuating said ring circuit to advance the conducting state to a succeeding transfer element, means controlled by said conducting transfer element to select a corresponding comparison circuit and a corresponding storage channel, means to apply said sum output pulse to the selected comparison circuit means, to apply a reference pulse simultaneously to said comparison circuit with said sum output pulse, means including said storage channel for directing an air-blast delayed with respect to said sum output pulse to deflect said fragment out of its path when the magnitude of said sum signal pulse bears a predetermined relationship to said refernce pulse.

21. Optical monitoring apparatus comprising a horizontal line source of illumination of periodically varying intensity, a photoelectric detector disposed to receive illumination from said source and to provide a signal proportional to the instantaneous intensity of the received illumination, means for passing opaque bodies to be monitored between said source and said detector at a velocity lying within a predetermined range of velocities, said signal having a resulting waveform related to the degree of occulting of said detector by said opaque bodies, signal amplifying means having a variable amplification ratio to amplify said signal and provide an output signal, gain control means including a resistance-capacitance circuit, means for applying a rectified portion of said output signal to said resistance-capacitance circuit, said resistance-capacitance circuit being designed to charge the capacitance in said circuit quickly to the highest peak value of said applied portion of said signal and to discharge slowly, and means to vary the said amplification ratio inversely according to the amount of charge on said capacitance.

References Cited in the file of this patent
UNITED STATES PATENTS

| | | |
|---|---|---|
| 2,190,563 | Horsfield | Feb. 13, 1940 |
| 2,362,774 | Rormanoff | Nov. 14, 1944 |
| 2,630,043 | Kolisch | Mar. 3, 1953 |
| 2,717,693 | Holmes | Sept. 13, 1955 |
| 2,850,645 | Chilton et al. | Sept. 2, 1958 |

OTHER REFERENCES

Germany, H 23,523 (Class 1a, Group 37), Aug. 9, 1956.